(12) United States Patent
Rizvi et al.

(10) Patent No.: US 11,559,928 B2
(45) Date of Patent: Jan. 24, 2023

(54) MICROCELLULAR MATERIALS WITH STRESS-ACTIVATED PORES EXHIBITING OPTO-MECHANICAL PROPERTIES AND THEIR USE AS SENSORS

(71) Applicant: The University of Toledo, Toledo, OH (US)

(72) Inventors: Syed Reza Rizvi, Toledo, OH (US); Sheikh Rasel, Toledo, OH (US); Md Emran Hossain Bhuiyan, Toledo, OH (US); Navid Namdari, Toledo, OH (US); Bilal Nizar Abdul Halim, Toledo, OH (US)

(73) Assignee: The University of Toledo, Toledo, OH (US)

( * ) Notice: Subject to any disclaimer, the term of this patent is extended or adjusted under 35 U.S.C. 154(b) by 0 days.

(21) Appl. No.: 16/795,930

(22) Filed: Feb. 20, 2020

(65) Prior Publication Data
US 2020/0276739 A1 Sep. 3, 2020

Related U.S. Application Data

(60) Provisional application No. 62/811,898, filed on Feb. 28, 2019.

(51) Int. Cl.
| | | |
|---|---|---|
| *B32B 5/18* | (2006.01) | |
| *C08J 9/12* | (2006.01) | |
| *B29C 44/34* | (2006.01) | |
| *B29C 43/22* | (2006.01) | |
| *B29K 9/06* | (2006.01) | |
| *B29K 77/00* | (2006.01) | |
| *B29K 105/04* | (2006.01) | |

(52) U.S. Cl.
CPC .......... *B29C 44/355* (2013.01); *B29C 43/22* (2013.01); *B29C 44/3403* (2013.01); *C08J 9/122* (2013.01); *B29K 2009/06* (2013.01); *B29K 2077/00* (2013.01); *B29K 2105/046* (2013.01); *B29K 2995/0025* (2013.01); *B29K 2995/0026* (2013.01); *C08J 2203/06* (2013.01); *C08J 2353/00* (2013.01); *C08J 2353/02* (2013.01); *C08J 2375/04* (2013.01)

(58) Field of Classification Search
CPC ............... C08J 2205/00; C08J 2205/06; C08J 2203/06; B32B 5/18; Y10T 428/249978; Y10T 428/249976; B29K 2995/0025; B29K 2995/0026; B29K 2105/046; B29K 2009/06; B29C 44/355
See application file for complete search history.

(56) References Cited

U.S. PATENT DOCUMENTS

| | | | | |
|---|---|---|---|---|
| 5,684,055 A | * | 11/1997 | Kumar | B29C 44/348 264/DIG. 83 |
| 6,025,405 A | * | 2/2000 | Snell Tung | C08L 67/00 521/182 |
| 2004/0171340 A1 | * | 9/2004 | Prasad | B24D 3/32 451/526 |
| 2012/0088258 A1 | * | 4/2012 | Bishop | A61B 5/14532 435/7.1 |

(Continued)

*Primary Examiner* — Joanna Pleszczynska
(74) *Attorney, Agent, or Firm* — MacMillan, Sobanski & Todd, LLC

(57) ABSTRACT

Materials that exhibit stress-induced porosity, and methods of making and using the same, are described.

29 Claims, 20 Drawing Sheets
(17 of 20 Drawing Sheet(s) Filed in Color)

(56) References Cited

U.S. PATENT DOCUMENTS

2013/0335807 A1* 12/2013 Arsenault ............. G02F 1/0128
    264/2.7
2014/0272379 A1* 9/2014 Watkins ............. B29D 35/0054
    428/316.6
2018/0125722 A1* 5/2018 Hoggarth ............ A61F 13/0223

* cited by examiner

MICROCELLULAR MATERIALS WITH STRESS-ACTIVATED PORES EXHIBITING OPTO-MECHANICAL PROPERTIES AND THEIR USE AS SENSORS

RELATED APPLICATIONS

This application claims priority to U.S. Provisional Application No. 62/811,898 filed under 35 U.S.C. § 111(b) on Feb. 28, 2019, the disclosure of which is incorporated herein by reference in its entirety.

STATEMENT REGARDING FEDERALLY SPONSORED RESEARCH

This invention was made with no government support. The government has no rights in this invention.

BACKGROUND

A plethora of biological systems cannot achieve certain biological functions without relying on some porous media for biological transport. For instance, the regulation of what enters and exits the cell (including oxygen, carbon dioxide, and other molecules and ions) cannot transpire if the cell membrane were not permeable (porous). Another example is the ability of the cuttlefish to use its cuttlebone, a bony, calcium carbonate-like material with almost 90% porosity, to achieve buoyancy control by controlling the flow of water in and out through the porous structure.

Synthetic attempts at systems with dynamic porosity have been focused mainly at length scales in the nanometer scale. Some have developed a non-destructive selective swelling method for creating dynamic porosity in di-block copolymers (BCP) structures. This method relies on individual blocks to have a significant contrast in solubility or polarity to a particular solvent, such that after a sufficient immersion period, the minority block phase swells and then upon drying releases the solvent, which acts as the porogen, in the plasticized matrix. Interestingly, subsequent exposure to the solvent results in a re-swelled structure, which appears to close the pores. However, only pores of 10-50 nm can be produced using this technique. Another phenomenon that falls under dynamic porosity is stimuli-activated pores, and the stimulus can be temperature, stress etc. Others have demonstrated one-way thermally activated pore contraction in microcellular shape memory polymer blends of thermoplastic polyurethane (TPU) and polylactide (PLA) using a solid-state foaming process. Upon cooling from the melt, the two polymers formed immiscible blends, whose morphology can be adjusted from co-continuous to nodular based on the TPU/PLA ratio. After processing, pores were observed in both TPU and PLA phases that were in the range of 1 to 30 μm. The porous structure was considered the temporary deformed shape, while the programmed shape was the starting non-porous blend. Although details of the specific molecular mechanism were not discussed, the logic employed was that heating the porous structure to 70° C., above the PLA's glass transition temperature ($T_g$), the structure will relax allowing the pores to shrink. Significant pore contraction was observed as indicated by relative density (porous: non-porous density ratio) of the 80/20 wt % TPU/PLA blend rising from 25% to 85% and the average pore size in the 50/50 wt. % TPU/PLA blend halving from 25 to 12 μm. SmartSkin™, a commercial wetsuit designed for divers by Midè Technology Corporation, is a wetsuit that can dynamically change the porous structure to regulate diver's body temperature. A passive closed-cell Neoprene foam is used in the outer layer of the wetsuit while the inner layer is made up an active hydrogel copolymer consisting of hydrophilic and hydrophobic blocks. As a result, the material can change the volume around a transition temperature that can be altered by the concentration of the components. Below the transition temperature (body temperature), the material swells while it can shrink above it. As a result, if the diver's body temperature exceeds the limit, material shrinkage increases the water intake whereas a fall in body temperature impedes the water flush to the material owing to hydrogel swelling.

There is a need in the art for new and improved porous materials.

SUMMARY OF THE INVENTION

Provided herein is a composition comprising a foam material comprising a polymer, wherein the composition exhibits stress-induced reversible porosity.

In certain embodiments, the composition exhibits temperature-activated reversible porosity.

In certain embodiments, the composition exhibits chemical-vapor-activated reversible porosity.

In certain embodiments, the polymer comprises a linear triblock copolymer.

In particular embodiments, the linear triblock copolymer comprises poly(styrene-ethylene/butylene-styrene) (SEBS).

In certain embodiments, the polymer comprises poly (styrene-butadiene-styrene) (SBS). In certain embodiments, the polymer comprises polyurethane (TPU).

In certain embodiments, the linear triblock copolymer is saturated with $CO_2$.

In certain embodiments, the composition is fabricated by casting a film of the polymer, placing the film in a high-pressure vessel with $CO_2$ for a first period of time, rapidly depressurizing the film, temperature quenching the film in water for a second period of time, and stabilizing the foam structure in a water bath.

In certain embodiments, the foam material has a thickness of about 0.2 mm.

In certain embodiments, the foam material has a thickness of about 1.3 mm.

In certain embodiments, the composition is homogeneous.

In certain embodiments, the composition is transparent.

In certain embodiments, the composition is opaque.

In certain embodiments, the composition has pores having an average size of about 10 μm or less.

In certain embodiments, the composition has pores having an average size of about 5 μm or less.

In certain embodiments, the composition exhibits stress-induced reversible porosity (SIRP).

In certain embodiments, the composition exhibits an ability to be re-foamed by pressurized $CO_2$ and recovered for several cycles while showing similar opto-mechanical properties at each cycle.

In certain embodiments, the composition exhibits an ability to be re-foamed by single or/and multiple tensile strain cycles without a pore forming solvent.

In certain embodiments, the composition is a homogenous, porous structure.

In certain embodiments, thermal activation triggers a pore reversion in the composition characterized by a volumetric recovery and an OTT behavior.

In certain embodiments, chemical vapors trigger a pore reversion in the composition characterized by a volumetric recovery and an OTT behavior.

Further provided is a method for making a foam structure, the method comprising casting a film of a polymer; placing the film in a high-pressure vessel with $CO_2$ for a first period of time to produce a foam structure; rapidly depressurizing the foam structure; temperature quenching the foam structure in water for a second period of time; and stabilizing the foam structure in a water bath.

In certain embodiments, the polymer comprises polymer comprises poly(styrene-ethylene/butylene-styrene) (SEBS), poly(styrene-butadiene-styrene) (SBS), or polyurethane (TPU).

In certain embodiments, the high-pressure vessel is at a pressure of about 800 psi (5.5 MPa).

In certain embodiments, the linear triblock copolymer comprises poly(styrene-ethylene/butylene-styrene) (SEBS).

In certain embodiments, the high-pressure vessel is at a temperature of about 30° C.

In certain embodiments, the temperature quenching is conducted in water a temperature of about 50° C.

In certain embodiments, the temperature quenching is conducted in water a temperature of about 70° C.

In certain embodiments, the temperature quenching is conducted in water a temperature of about 90° C.

In certain embodiments, the second period of time is about 30 seconds.

In certain embodiments, the first period of time is about 2 hours.

In certain embodiments, the casting comprises compression molding of the film in a mold and hot pressing the film.

In certain embodiments, the water bath is at a temperature of about 25° C.

In certain embodiments, the method further comprises applying pressure to the foam structure to produce a recovered foam structure.

Further provided is a pressure-sensitive, temperature-sensitive, and chemical-sensitive material as described and shown herein.

Further provided is a method for making a pressure-sensitive, temperature-sensitive, and chemical-sensitive material as described and shown herein.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

FIG. 1A shows a schematic of the foaming and re-foaming process. FIG. 1B shows an opto-mechanical setup for light transmittance measurement. FIG. 1C shows chronological pictures of neat, foamed, and recovered SEBS. FIGS. 1D-1E show SEM micrographs of foamed and recovered samples for SEBS-50, respectively. Scale bars, 5 mm.

FIG. 2A shows a histogram of pore size for porous and recovered SEBS-50. FIG. 2B shows in-situ SIRP for SEBS-50 at different compression loadings.

FIG. 3A shows SEM micrographs of cryo-fractured surfaces of SEBS foams saturated for 2 hours in $CO_2$ followed by temperature quenching after a rapid depressurization. FIG. 3B shows density plots for the foams and recovered foams that were processed at different temperatures. FIG. 3C shows the plot of pore size for SEBS foams made at different temperatures. FIG. 3D shows in-situ SIRP of SEBS foams with different average pore size. Scale bars, 10 mm.

FIG. 4A shows an overview of first heating differential scanning calorimetry (DSC) measurements for SEBS-50 foams at different processing conditions ranging from −75° C. to 180° C. with a heating rate of 2° C. $min^{-1}$. FIG. 4B shows wide-angle X-ray Diffraction (WAXD) intensity graphs for SEBS-50 at various conditions performed at room temperature.

FIG. 5A shows in-situ SIRP test results for the strain rate effect on SEBS-50 samples loaded to 3.8 MPa. FIG. 5B shows energy absorbed during loading and unloading for SIRP test of SEBS-50 at different strain rates. FIG. 5C shows images of SEBS-50 samples used for strain rate effect.

FIG. 6A shows SEM images for second, third, and fifth refoaming cycles of SEBS-50. FIG. 6B shows re-foaming density results for the re-foaming process of SEBS-50. FIG. 6C shows in-situ SIRP of SEBS-50 foams at different re-foaming cycles. Scale bars, 10 mm.

FIG. 7A shows strain-assisted re-foaming plots for 10 cycles. FIG. 7B represents the pictures for original 1.3-mm-thick SEBS, SEBS-50 foams and recovered SEBS-50 foams at 1st and 10th cycles, respectively. FIG. 7C shows the foams morphologies using optical microscopy. Scale bars: 300 μm.

FIG. 8A shows the in-situ SIRP results for different block copolymer elastomers. FIG. 8B shows stress-strain plots for block copolymer foams revealed that the stress sensitivity of foams.

FIG. 9A shows temperature-driven OTT for SEBS-30 at 125° C. over a period of 3 min. Scale bars: 1 cm. FIG. 9B represents the foam's corresponding morphologies before and after temperature recovery. Scale bars: 10 μm.

FIGS. 10A-10D show histograms for the pore size distribution of as-made SEBS-30 and SEBS-50 and their corresponding temperature-recovered samples. FIG. 10 E: Density results by water-displacement method for SEBS and SBS foams that underwent a temperature recovery step.

FIGS. 11A-10B: FIG. 11A: A schematic showing the setup used for foams' vapor-driven OTT.

FIGS. 15C-15D show SEM images of recovered impinged cell areas resulted in some unrecovered opaque spots in the SEBS-70 and SEBS-90 samples. Scale bars: 5 μm.

DETAILED DESCRIPTION

Figure 1A:
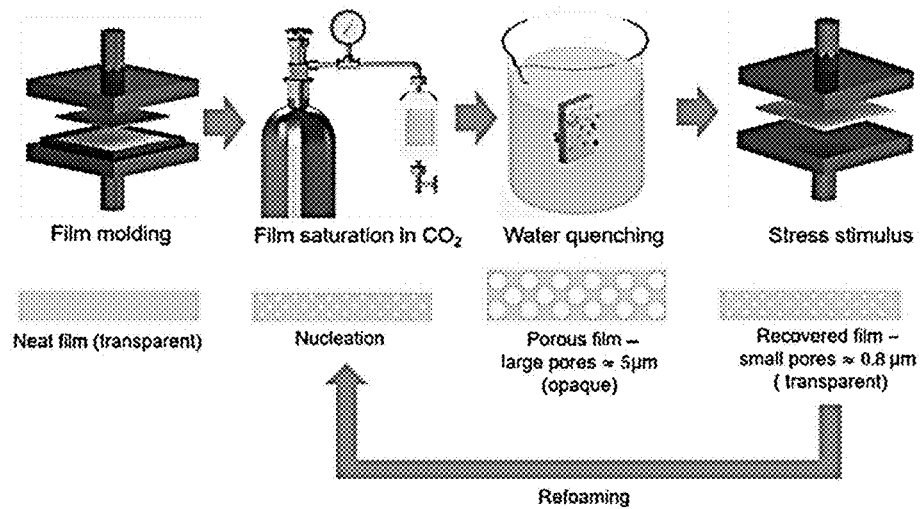
FIGS. 1A-1E.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein are microcellular-shape-memory materials with stress and temperature, and chemical vapor activated pores, resulting in a high volumetric recovery in conjunction with opto-mechanical properties. In the examples herein, microcellular materials exhibiting stress activated porosity were developed using the linear copolymers of poly(styrene-ethylene-co-butylene-styrene) (SEBS) while the effect was general enough to be demonstrated with poly(styrene-butadiene-styrene) (SBS) and thermoplastic polyurethane (TPU) as well. Similar to other block copolymers, SEBS can intertwine the superior features of ethylene-co-butylene (EB) soft segments and PS hard segments, and interestingly the solubility of gases like $CO_2$ is higher in the soft segments than the hard ones. The mechanical behavior of block copolymer can be controlled by the microdomain structure, interdomain spacing, chemical structure, and molecular weight of the constituent blocks. Carbon Dioxide ($CO_2$) gas was used as a physical blowing agent (BA) in solid-state processing method, at different quenching temperatures. A relatively low critical point, tunable solvent properties, and small toxicity have made the $CO_2$ gas a desirable solvent in polymer preparation and processing. Moreover, saturating polymers with $CO_2$ with subsequent rapid depressurization is considered as an environmentally benign and well-founded process for making polymers with microcellular features.

In some embodiments, provided herein is a homogenously porous material whose pores shrink upon an applied compressive stress. An opaque-to-transparent transition (OTT) may be clearly visible. The material may have two-way reversible porosity, where the porosity is controlled by stimuli such as stress, temperature, or solvents. The porosity may affect all material properties, including the mechanical, electrical (dielectric), transport (mass, heat, sound), and optical properties of the material. The material may be useful in pressure, temperature, and chemical sensors, or for other applications requiring dynamic "smart" or "shape memory porosity". For example, the material may be used in certain chemical mass transport or heat transfer applications. The materials may be made through solid-state batch foaming using a foaming agent such as $CO_2$ gas. Pressure-induced opaque to transparent transition (OTT) of the foams were characterized by in-situ observations using a custom-made opto-mechanical setup.

The fabrication of micro-structured films with dynamic porosity is useful in various applications. The present disclosure describes the fabrication of microcellular foams exhibiting a huge volumetric recovery upon applying an external pressure stimulus. In the examples herein, it is shown that the dynamic volumetric recovery is in conjunction with an opaque to transparent transition (OTT) that imparts the material with unique opto-mechanical behavior. The recovered foams have transparency almost equal to the as-cast films.

EXAMPLES

The foaming process used for the present examples was the solid-state foaming technique with $CO_2$ gas as a physical blowing agent. Poly(styrene-ethylene/butylene-styrene) (SEBS) was mainly used as foaming material. Polystyrene (PS) hard blocks in SEBS play a key role in this process since $CO_2$ reduces the $T_g$ of PS and enables ethylene-butylene (EB) soft parts to swell during saturating stage while upon depressurization their $T_g$ increases again that prevents the forming pores from collapse. A custom-made in-situ opto-mechanical setup was used for optical and mechanical characterizations. Opto-mechanical tests at different strain rates and loads revealed that the films undergo a gradual OTT behavior indicative of optical pressure-sensitive foams. Quenching temperature is of great importance for the OTT behavior, since the foams show varying internal microstructure by tuning the quenching temperature. Moreover, herein it is shown that after pressing the foams, the transparent films can be re-foamed by the same process for many cycles.

Furthermore, stretching the films in a direction orthogonal to that of pressing, causes the film to be re-foamed without the need for any further pressurized pore-forming agent. This causes the now transparent films to revert back to their opaque form (bidirectional OTT behavior).

Materials and Methods

Fabrication of SEBS Foams

The base material in these examples was a linear triblock copolymer called poly(styrene-ethylene/butylene-styrene) which was purchased from Kraton Polymers Inc. (USA) with a G1645 grade with a weight average molecular weight of $M_w$=82 000 g mol$^{-1}$. The polydispersity index ($M_w/M_n$) for this grade was reported as 1.397, which has 11.3 wt. % of atactic PS blocks). This type is referred to as SEBS throughout the present disclosure. SEBS G1642 (the same molecular weight as of G1645 but with ~20 wt. % of PS, which is named as SEBS-H), poly(styrene-butadiene-styrene) (SBS) D4150 (31 wt. % PS) from Kraton Polymers Inc., and Thermoplastic Polyurethane (TPU) Desmopan 385 from Covestro LLC were also used in these examples.

Figure 12:
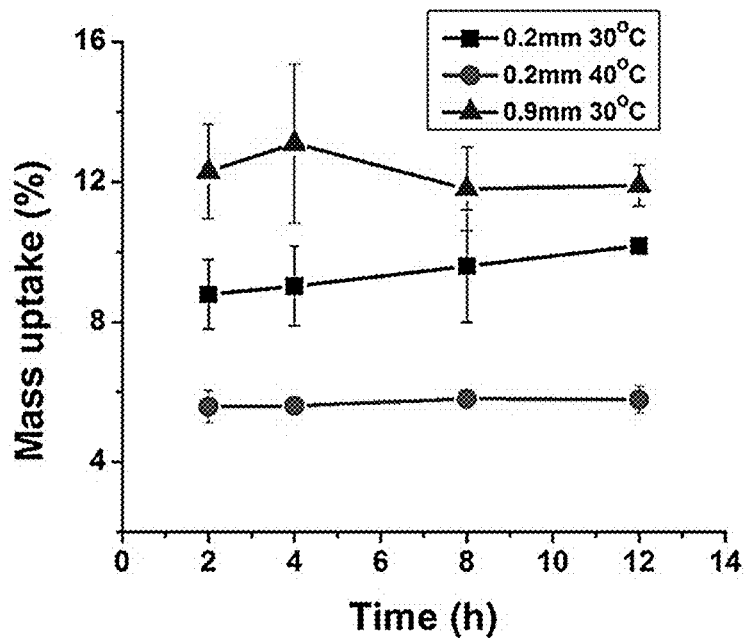
FIG. 12: Mass uptake for neat SEBS films of different thickness measured at 30° C. and 40° C.

Rectangular samples of dimensions 60.00×60.00×0.2 mm$^3$ were fabricated with a compression molder (Carver Model 4386) with a custom-made steel mold at 190° C. and hot pressed for 10 min. Then, the as-cast SEBS film was placed in a high-pressure vessel with $CO_2$ at 800 psi (5.5 MPa) for 2 hours at 30° C. A 2-hour saturation time was selected at 30° C. since for 0.2 mm films there is not a significant increase in mass uptake for pressurizing for more than 2 h (FIG. 12).

In the saturation stage, the high-pressure vessel temperature was set at 30° C. using a band heater since the solvent quality of $CO_2$ can fall by decreasing the pressure as well as temperature. Next, the film underwent a rapid depressurization followed by a temperature quenching in water at different temperatures (30° C., 50° C., 70° C., 90° C.) for 30 seconds and then stabilizing the foam structure by immersing it in a 25° C. water bath. These foams are labeled as SEBS-30, SEBS-50, SEBS-70, and SEBS-90, respectively, for ease of reference. These two steps are important in forming a homogenous, closed-cell microcellular structure since rapid depressurization causes a thermodynamic driving force for $CO_2$ phase separation, while the temperature quenching lowers the matrix viscosity allowing for easier growth of the nucleated gas bubble.

FIG. 1A illustrates the solid-state foaming process as well as its re-foaming, where the film is re-saturated after being pressed (recovered). Furthermore, density measurements were done using a high precision balance (Sartorius QUINTIX125D-1S) and a micrometer (Mitutoyo Model 293-340).

Opto-Mechanical Measurement Device

Figure 1B:
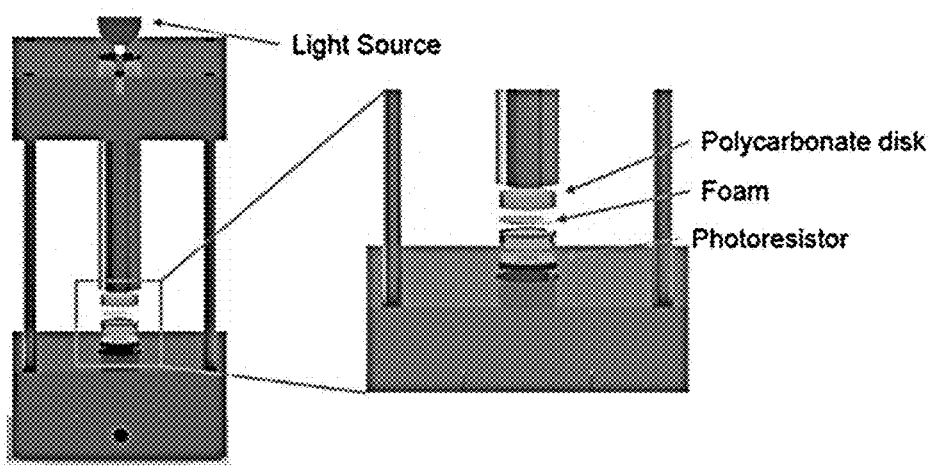

An opto-mechanical setup comprised of a tubular punch and a base—containing the sample—was built to study in-situ OTT behavior of the foams (FIG. 1B). A white-light LED was placed on top of the punch, which transmitted light through the sample while a photoresistor was placed under the sample's fixture to measure the light's intensity. The foam was then sandwiched between two polycarbonate disks of 2 mm thickness. As the setup was being pressed uniaxially by a universal testing instrument (Instron Model 5969 Mechanical Tester), the photoresistor can read resistance values due to the changes in the light intensity coming from the LED and penetrating the foam which slowly becomes transparent. The loading and unloading compression tests were performed with the same rate of 0.2 mm min$^{-1}$. For analyzing the strain rate effect on mechanical and opto-mechanical behavior of foams, various strain rates varying from 0.2 to 15 mm$^{-1}$ min were evaluated. Full transparency (100% transmittance) was considered as the amount of light transmitted in an as-cast film without any porous features. The voltage data generated from the photoresistor was collected using an Arduino 1.8 open-source microcontroller.

Thermal Properties Characterization of the Foamed and Recovered Porous SEBS

Thermal properties of the films were analyzed by a differential scanning calorimetry (DSC) machine (TA Instruments Q20 DSC) under a nitrogen atmosphere from −75 to 180° C. at a scan rate of 2° C. min$^{-1}$.

Morphological Characterization of the Foamed and Recovered Porous SEBS Using Scanning Electron Microscopy (SEM)

In order to observe their internal microstructure, the samples were cryo-fractured in liquid nitrogen. The cryo-fractured surface was characterized by a scanning electron microscope (SEM) (JEOL JSM-7500F SEM). A 5 keV electron beam at a working distance of 15 mm was used to observe secondary electron images. The non-conductive samples were sputter coated (Denton Vacuum Desk II) using a gold target.

X-Ray Powder Diffraction (XRD)

X-ray diffractometer (Rigaku Ultima III high-resolution XRD) was done using a Cu Ka target operated at 40 kV and 44 mA.

Results

Figure 1C:
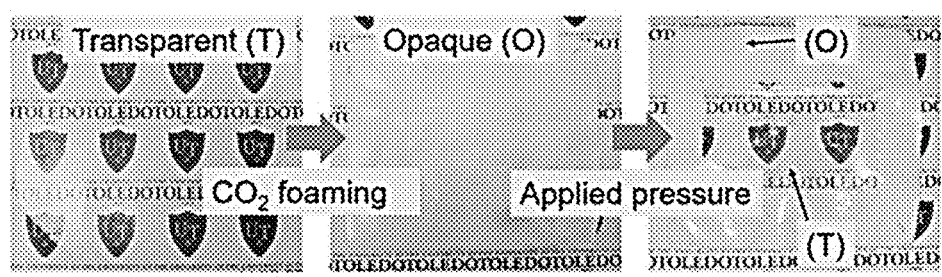

All foams exhibited a homogenous, closed-cell porous structure and appeared characteristically opaque due to internal voids acting as light scattering centers. The porosity of the films was controlled by the quenching temperature. These foams are sensitive to stress and exhibit a stress-induced reversible porosity (SIRP) behavior in the area where the stress is applied (FIG. 1C). Interestingly, the OTT transition is not reversible if the loading is >0.62 MPa, which means upon unloading, the foam does not recover back but stays in a state similar to neat SEBS with 100% transparency.

Figure 1D:
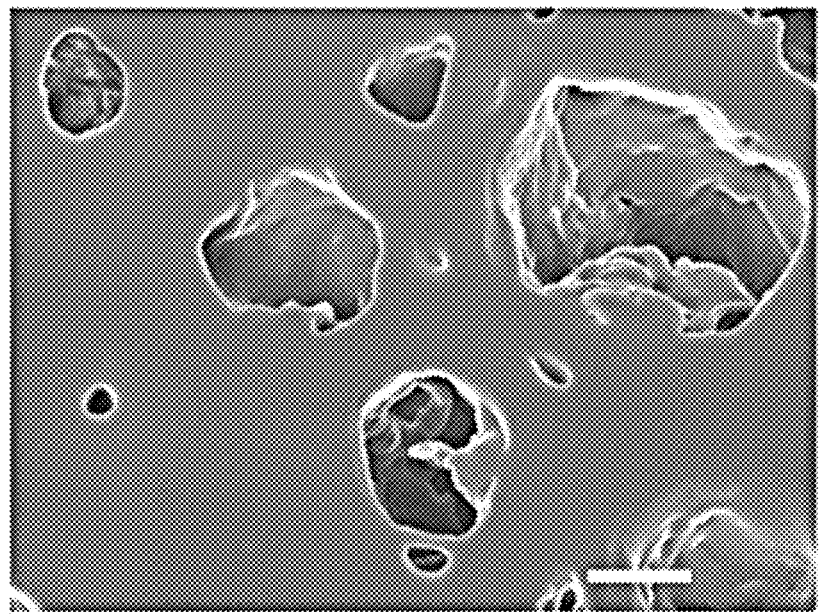
Figure 1E:
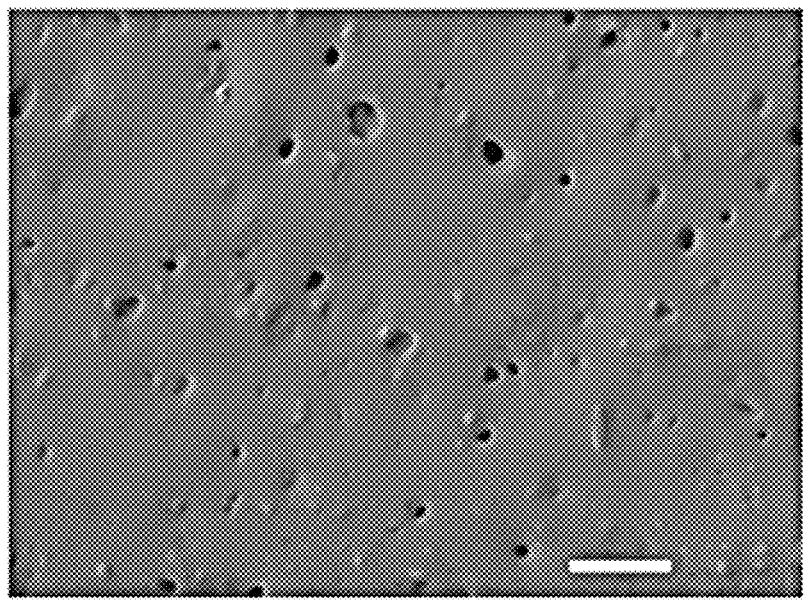

According to FIGS. 1D-1E, SEM images of the porous SEBS cross-section as well as recovered SEBS (after applying stress) demonstrated a drastic affine decrease in pore size. This is not typical behavior for porous structures made from soft, hyperelastic materials, which are known for their large elastic recovery upon compression. As mentioned previously, exhaustive efforts for a literature description of the observed stress-induced porosity phenomenon proved fruitless.

Figure 2A:
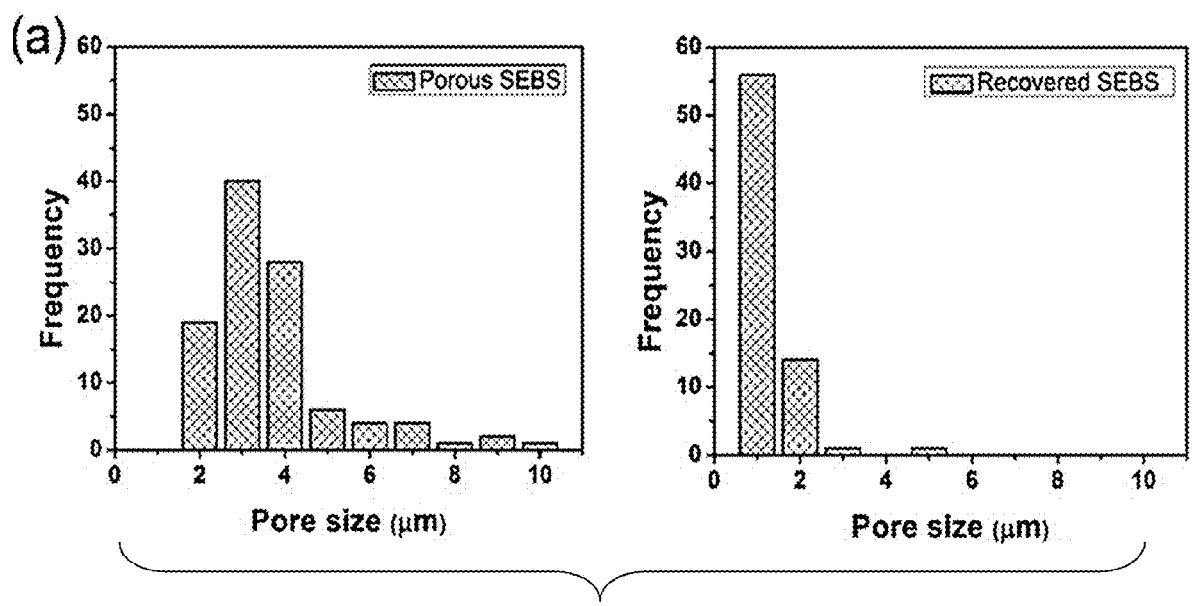
FIGS. 2A-2B.

FIG. 2A shows the histograms of porous and recovered SEBS-50 samples saturated for 2 h at 800 psi (5.5 MPa). According to the histograms, a significant recovery of the pore size distribution from 2-10 mm to 1-2 mm is observed, indicating this as the microstructural change responsible for the OTT behavior.

Figure 2B:
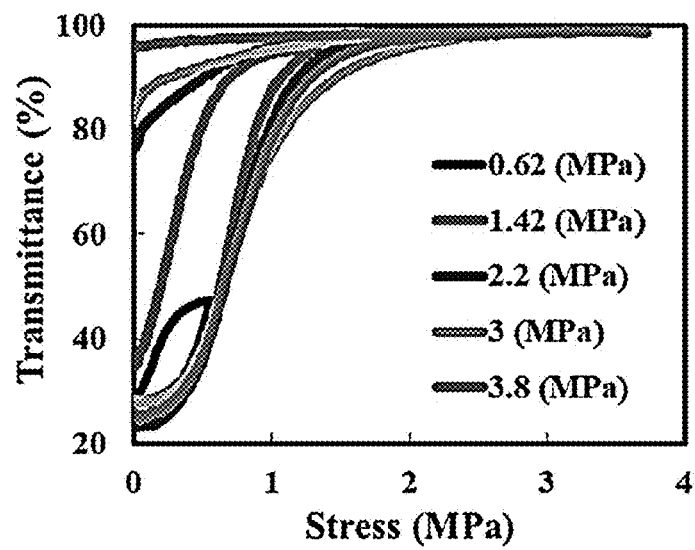

FIG. 2B illustrates the SIRP behavior of the same sample at different compressive loads (at 0.2 mm min$^{-1}$ rate) that was measured through the in-situ observations by the opto-mechanical setup. The transparency of foams upon compression increases from a start value of ~30% transmittance, that is reversible if the stress is less than a critical reversible stress ($\sigma_{rev}$=0.62 MPa). This reversible feature is attributed to hyperelastic recovery of elastomeric materials with a poison's ratio of close to 0.5. If stress surpasses the reversible transparency limit ($\sigma > \sigma_{rev}$), the transmittance keeps increasing with increasing stress up to a peak value, while during unloading the transmittance reduces to a certain value higher than the original state. This behavior is related to the dominant hyperelastic behavior of the SEBS films. However, interestingly, an irreversible compressive stress of 3.8 MPa ($\sigma_{irrev}$=3.8 MPa), is shown to act as a permanent recovery threshold (~100% transmittance) resulting in a permanent OTT behavior which is termed stress-induced reversible porosity (SIRP). It should be noted that the transparent area will appear as a small spot in the center of the film due to St. Venant's principle leading to a more concentrated stress distribution in the center, which grows to a large spot covering the whole area of the sample as the loading exceeds $\sigma_{irrev}$.

Figure 13:
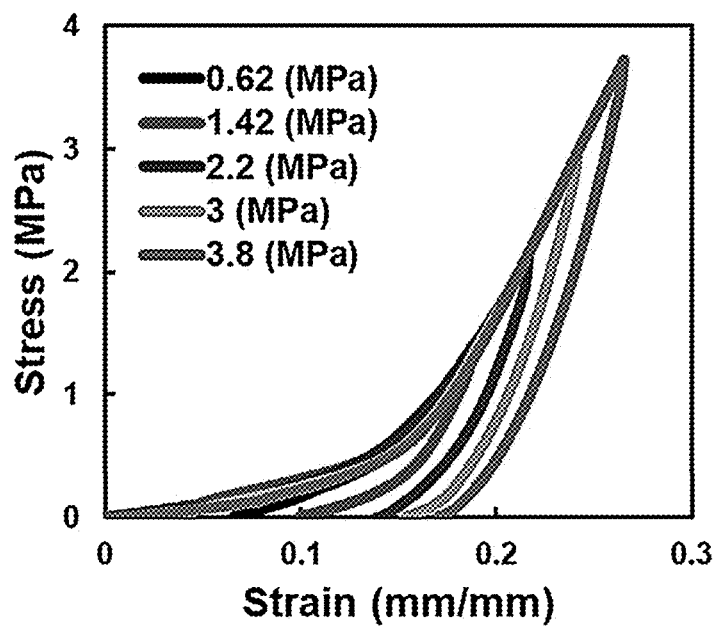
FIG. 13: Stress-strain behavior of SEBS-50 at different compressive stress levels at a 0.2 mm/min rate.

The stress-strain behavior during uniaxial compression tests performed on SEBS-50 at 0.2 mm min$^{-1}$ are illustrated in FIG. 13. The loading behavior has two distinct regions of elastic deformation and densification. The large hysteresis between loading and unloading curves is typical of mechanically compliant foams. The unloading curve shows a larger unrecovered stress at the end of unloading when $\sigma > \sigma_{rev}$ is applied that is attributed to unrecovered pore retraction upon loading. Moreover, there is a direct relationship between pore size, light transmittance, and applied stress in a way that increasing the applied stress will result in a significant decrease in the pore size down to ~1 mm or less, a level that cannot refract the light anymore. Furthermore, this same relationship applies to pore density (# of pores/cm$^3$) where increasing stress results in decreasing pore density and higher transparency. Thermal activation, such as heating the foams up to 125° C., also triggered a pore reversion characterized by a volumetric recovery and an OTT behavior.

Figure 3A:
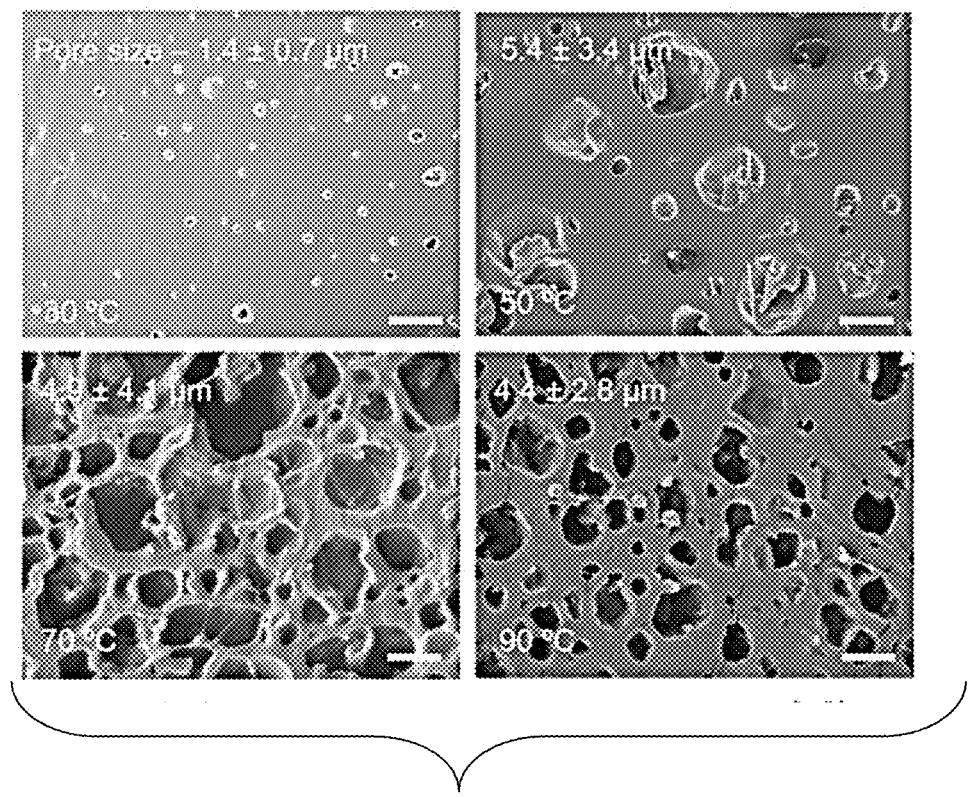
FIGS. 3A-3D.

The effect of quenching temperature on the foaming process was studied by saturating the samples at 800 psi (5.5 MPa) for 2 h followed by quenching the sample at 30 (SEBS-30), 50 (SEBS-50), 70 (SEBS-70), and 90° C. (SEBS-90). The effect of quenching temperature on pore size and pore density is shown in Table 1. EM micrographs of foams prepared by different quenching temperatures in FIG. 3A show a significant change in the average pore size. SEBS-30 possesses a finer porous structure (~1.4 μm) while SEBS-50 has the highest average pore size (~5.4 μm). SEBS-70 and SEBS-90 foams, however, have a slightly reduced average pore size (~4.9 and 4.4 μm, respectively) than SEBS-50 and with a denser, impinged closed-cell structure.

Table 1—Average pore size and pore density measurements for the foams fabricated at different quenching temperatures:

TABLE 1

| Sample | Average pore size (μm) | Pore density (pores · cm$^{-3}$) |
| --- | --- | --- |
| SEBS-30 | 1.4 ± 0.7 | 1.7 × 10$^9$ |
| SEBS-50 | 5.4 ± 3.4 | 0.7 × 10$^9$ |
| SEBS-70 | 4.9 ± 4.1 | 11.5 × 10$^9$ |
| SEBS-90 | 4.4 ± 2.8 | 2.1 × 10$^9$ |

Pore density measurements as the number of pores in initial volume of the material were measured using Eq. 1:

$$n = \frac{(N/A)^{3/2}}{p_r}$$

where N is the number of pores in a cross-sectional area (A) and $p_r$ is the ratio of foamed material density to the neat material density called relative density.

Figure 3B:
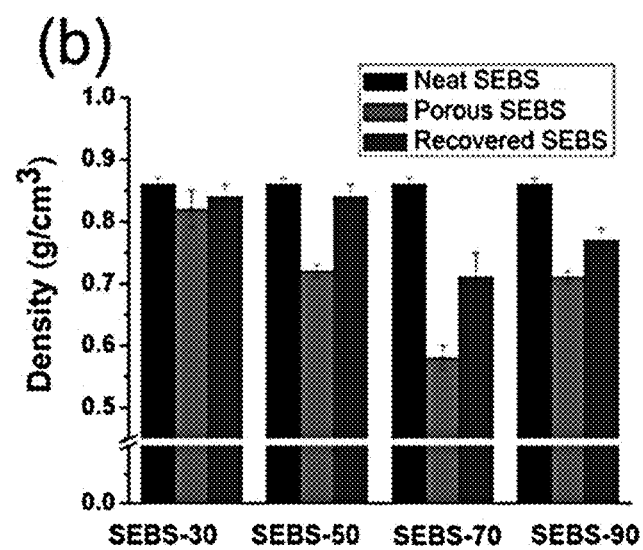

Density plots for pristine, foamed, and recovered SEBS are shown in FIG. 3B. As can be seen, the sample's density decreases after foaming while increases again close to its original density after stress induced recovery. The highest and lowest density after foaming are associated with SEBS-30 and SEBS-70 samples, respectively. The effect of quenching temperature on the porosity before and after recovery shows a significant decrease in the pore size after recovery (FIG. 3C).

Figure 3C:
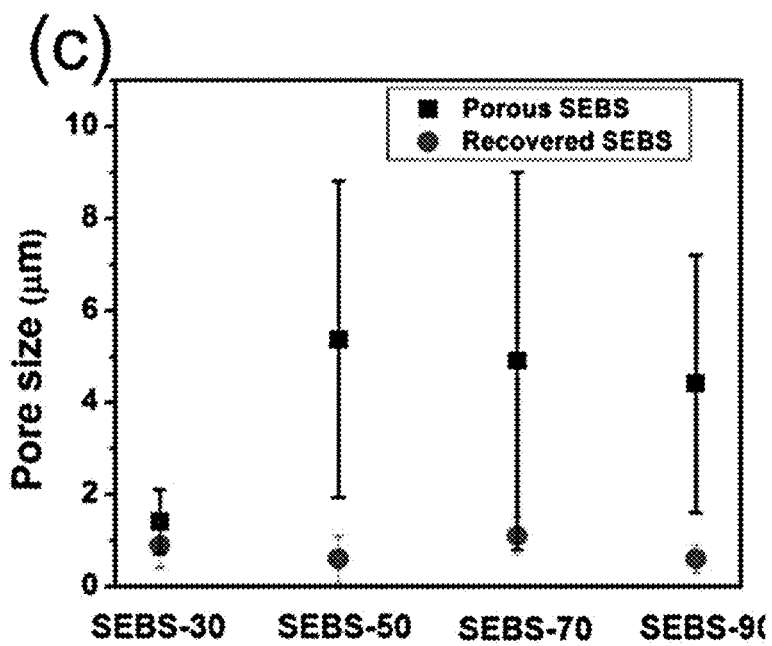

As can be seen in FIG. 3C, the average pore size increases to its peak for a quenching temperature of 50° C., while reducing slightly at the higher temperatures. SEBS-30 has a significantly lower average pore size compared to the other conditions because of the higher viscosity of the material at 30° C. suppressing pore expansion. As discussed later, differential scanning calorimetry (DSC) data for SEBS shows a transition around 70° C. related to PS's glass transition temperature (Tg). Above this Tg, PS blocks are softened, facilitating pore nucleation and growth in the block copolymer matrix that otherwise would not be possible at lower temperatures, resulting in a dense porous structure. However, as the temperature rises close to 90° C., the material softens to the point that sustained pore expansion cannot continue due to pore wall collapse, resulting slightly smaller average pore sizes in comparison to at 70° C. The SEBS-50 has the highest average pore size since the pore formation is only limited to EB segments while the viscosity of polymer chains in the EB domains is low enough for nucleation sites to expand with the fewest pore collapse with respect to SEBS-70 and SEBS-90.

Figure 3D:
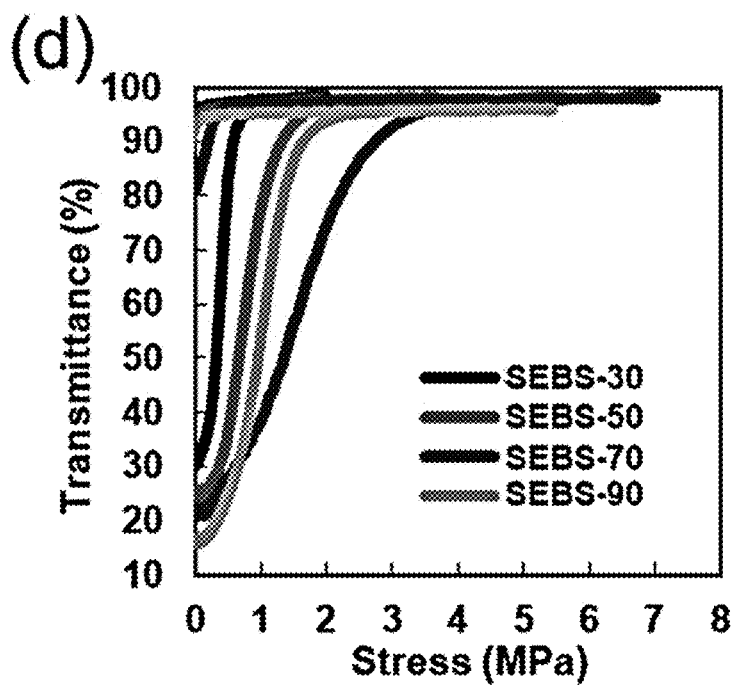

As shown in FIG. 3D, foams of different average pore size exhibit different optical properties during in-situ SIRP tests. SIRP test revealed that the SEBS-70 takes ~7 MPa for permanent recovery, which is the highest among the various processing scenarios considered.

Figure 14:
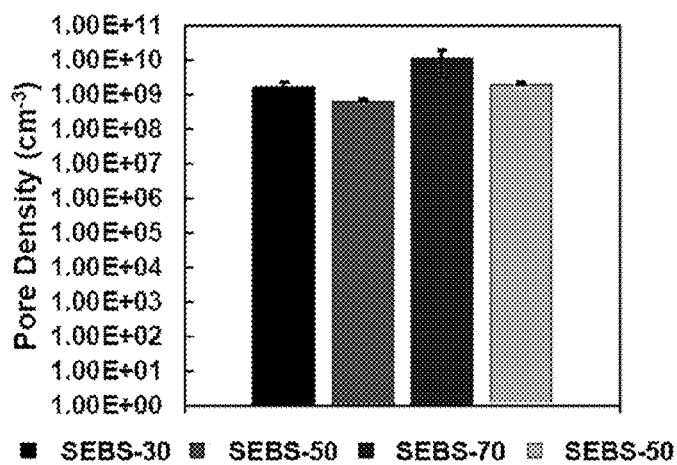
FIG. 14: Pore density of the foamed samples at different quenching temperatures.
Figures 15A, 15B, 15C, 15D:
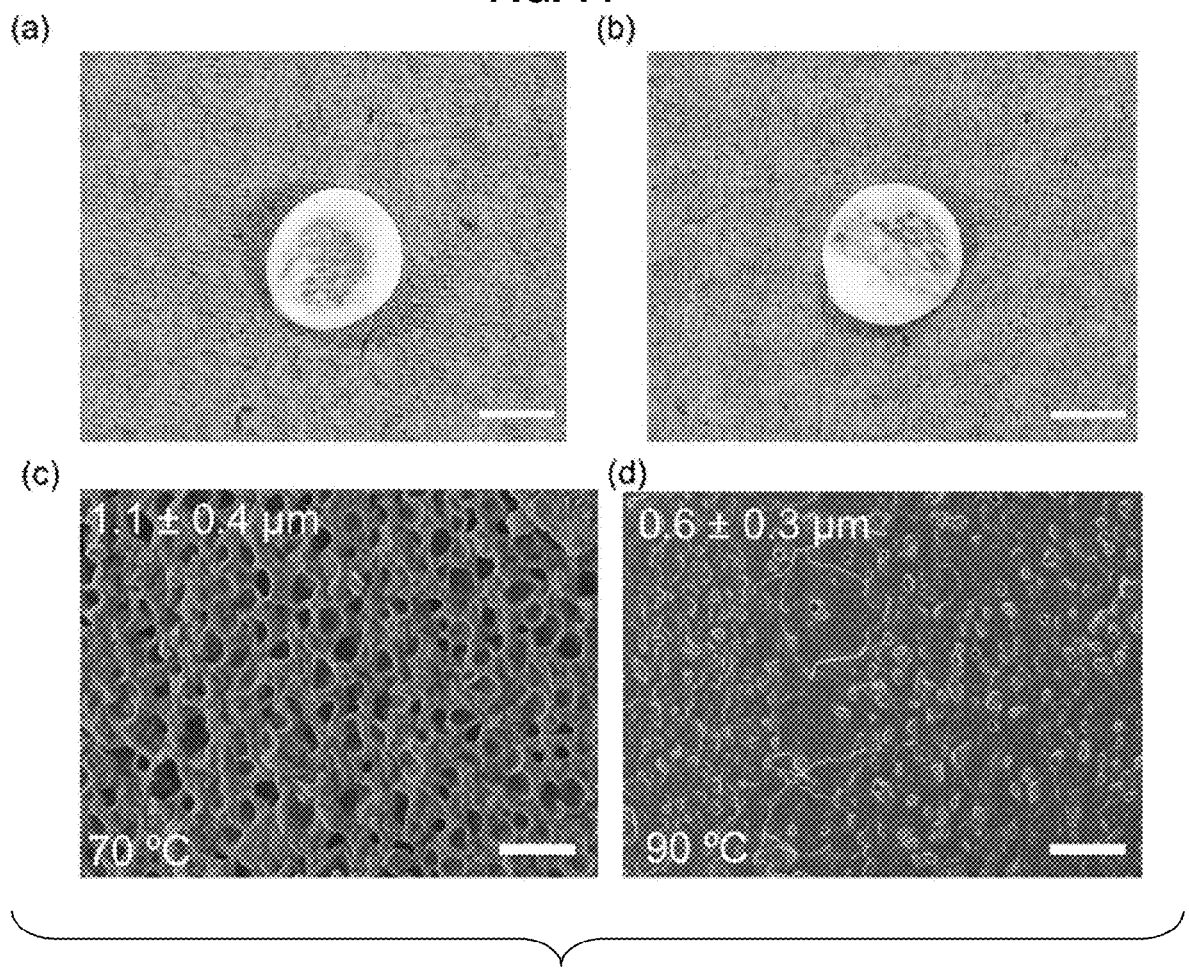
FIGS. 15A-15D: Impinged porous structure of SEBS-70 (FIG. 15A), SEBS-90 (FIG. 15B). Scale bars: 5 mm.

According to the results of pore density measurements (FIG. 14), it has a higher pore density with respect to SEBS-50 and SEBS-90 with almost the same average pore size (~5 μm). Possessing more pores endows the SEBS-70 foam with an impinged structure that requires higher stress for bending and buckling of the pores during compression. However, the transmittance at permanent recovery stage for SEBS-70 and SEBS-90 undergoes a drop at the end of unloading cycle, which is due to some opaque regions—light refracting sites—that remain in the recovered foam due to a packed impinged structure (FIGS. 15A-15D).

Figure 16:
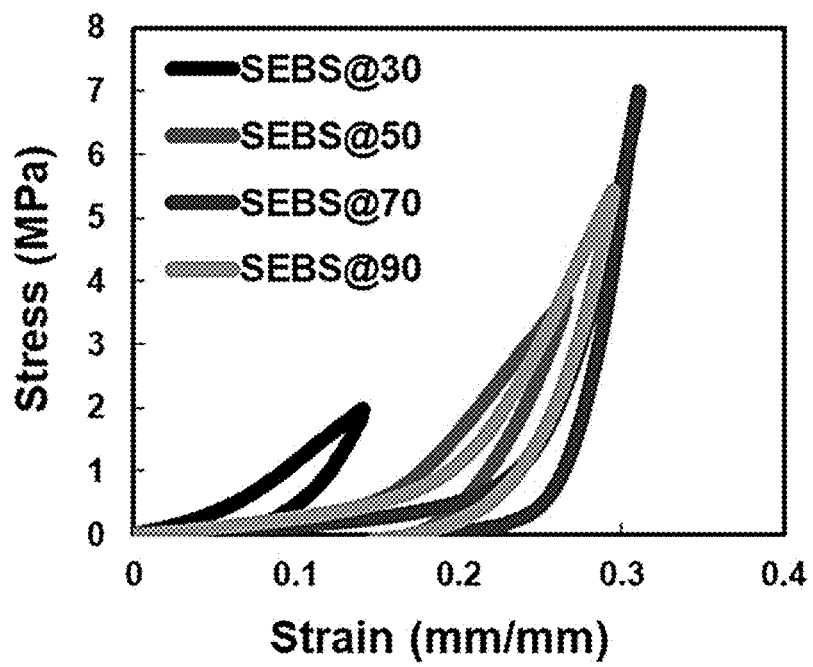
FIG. 16: Stress-strain behavior of SEBS-30, SEBS-50, SEBS-70, and SEBS-90 at a 0.2 mm $min^{-1}$ rate. (Maximum stress is equal to $\sigma_{irrev}$ for each case).
Figure 17:
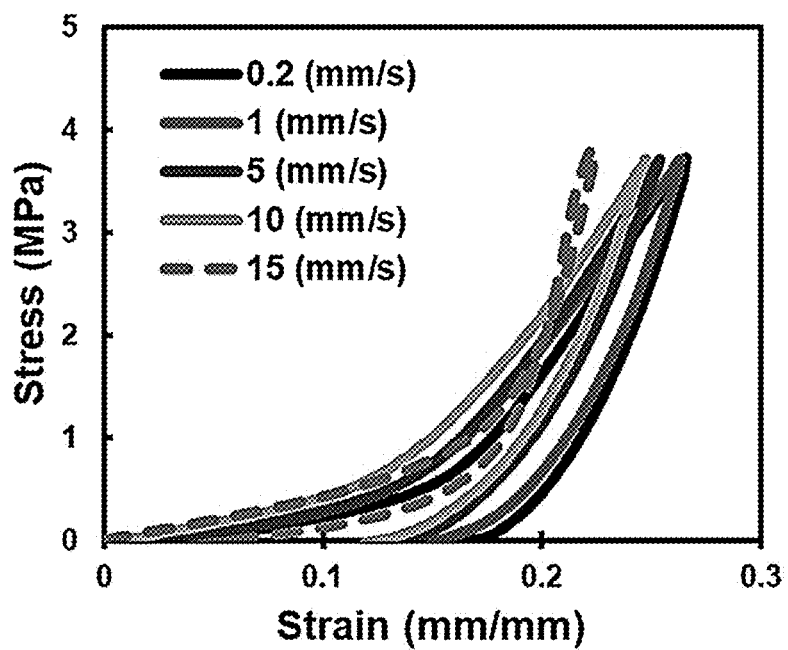
FIG. 17: Stress-strain plot for strain rate effect on stress induced reversible porosity behavior of SEBS-50 foam.

Stress-strain behavior of samples foamed at different quenching temperature confirms that bending and buckling of pores are more significant for SEBS-70 and SEBS-90 where a linear increase in loading occurs up to 0.2 strains before the non-linear increase of load during foam densification (FIG. 16).

On the other hand, SEBS-30 and SEBS-50 show an OTT recovery equal to that of as-made films at the end of the unloading cycle making them the best options for optical pressure sensor applications. The former has the lowest average pore size, which results in need of less stress than the latter with a higher average pore size.

Figure 4A:
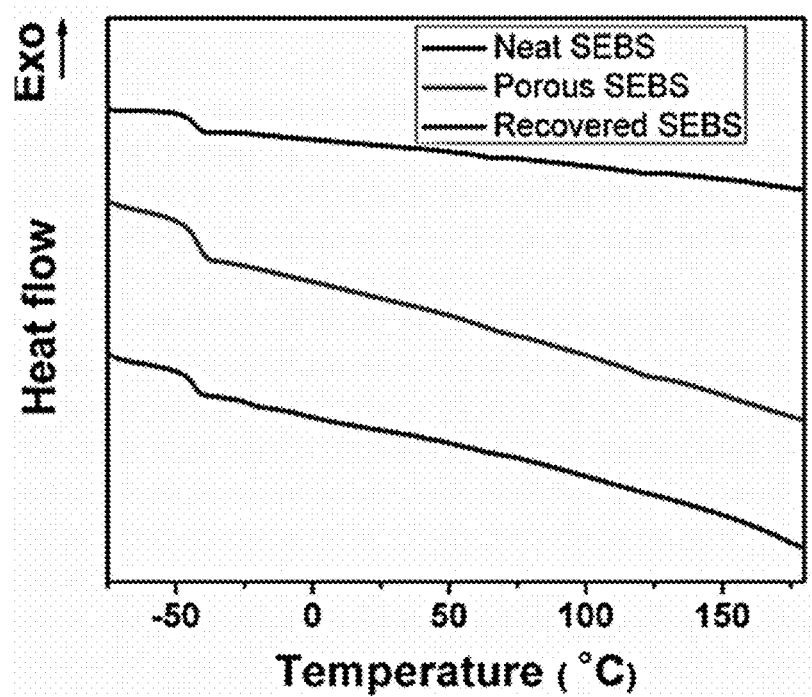
FIGS. 4A-4B.

In order to study the mechanism for the unique OTT during compression, a series of characterizations were performed. First-cycle heating DSC thermographs of pristine, foamed, and recovered SEBS-50 samples show a distinct $T_g$ around −40° C. corresponding to EB domains (FIG. 4A). PS domains are generally expected to have a $T_g$ of 30° C. or above, which might not always be clearly observable by DSC. The DSC results show a small noticeable transition at 70° C., which is the $T_g$ of PS blocks.

Figure 4B:
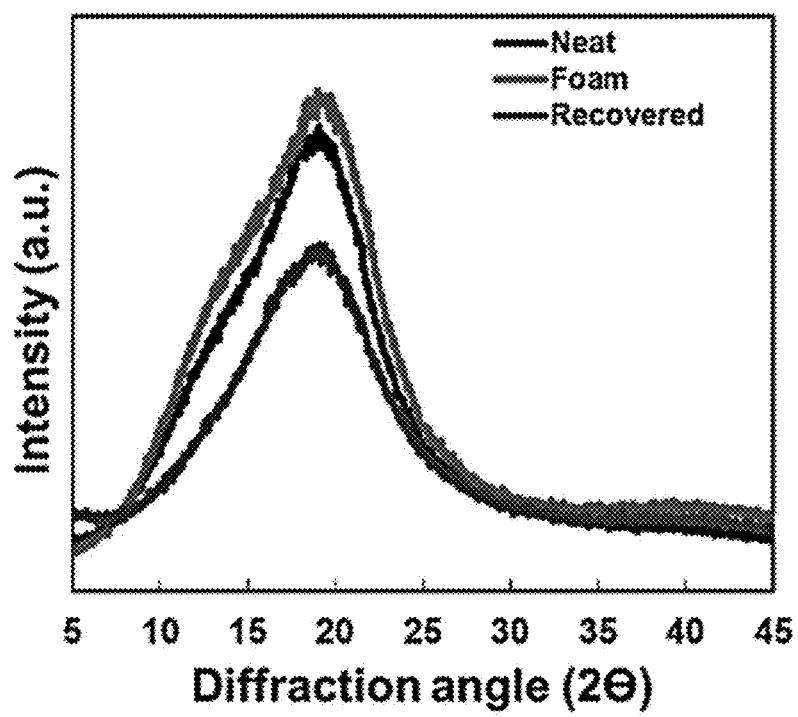

In order to study the long-range order of the material, WAXD measurements on SEBS-50 were performed (FIG. 4B). For all cases, a broad diffuse scattering pattern centered at ~20° associated with the EB block can be seen, showing typically a short-range order only without any proof of crystallinity. After foaming the intensity of the peak increases while upon the recovery step a significant fall can be observed, resulting in a smaller full-width at half maximum (FWHM). However, one cannot conclude on the degree of crystallinity of each case due to the presence of an amorphous halo without any sharp diffraction patterns. As a result, due to identical thermal and crystallographic structure of the samples at different conditions, it is believed that entropic relaxation of polymer chains during compression is responsible for SIRP and thus the OTT behavior.

Figure 5A:
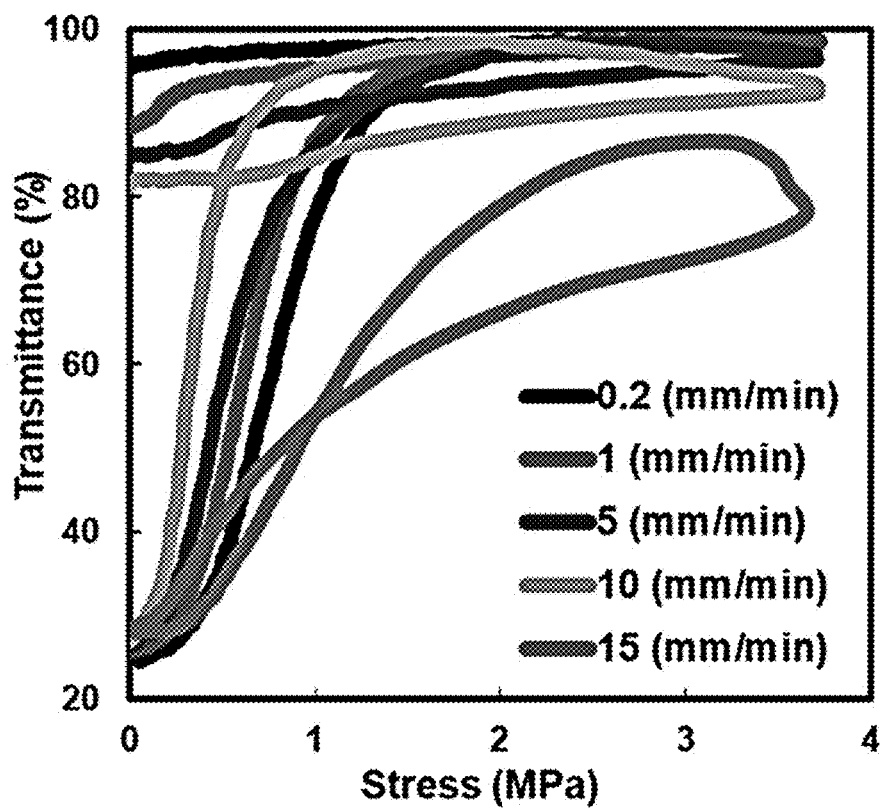
FIGS. 5A-5C.
Figure 5B:
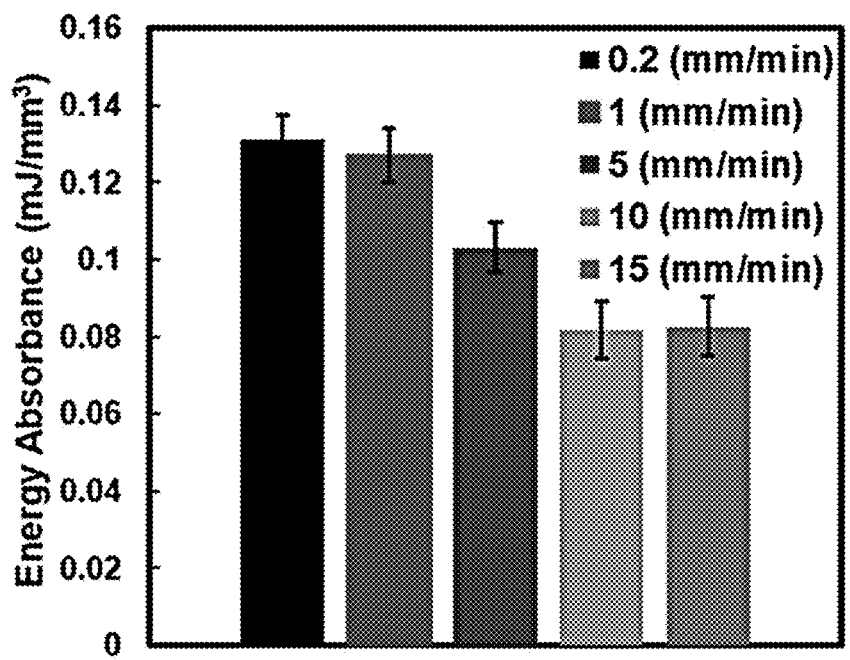
Figure 5C:
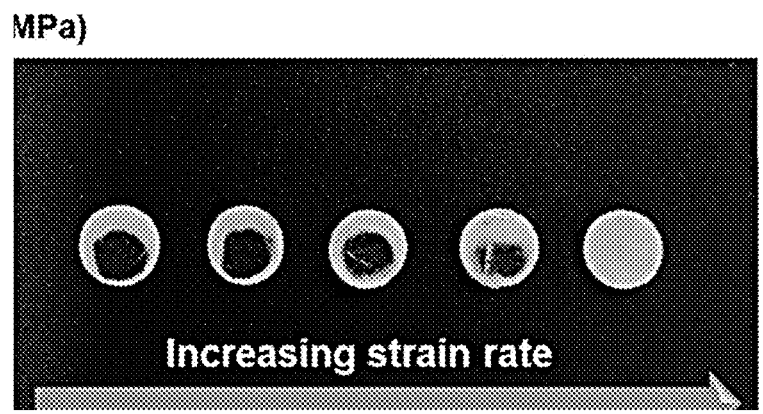

Effect of strain rate on SEBS-50 SIRP behavior is illustrated in FIG. 5A and FIG. 5C, which indicate that the pore recovery, indicated by final transparency of the pressed foam, is adversely affected by an increasing strain rate. Interestingly, these foams did not exhibit any pore recovery when an instantaneous hammering load is applied. This is correlated to the energy absorption of the foams during loading and unloading (FIG. 5B and FIG. 7).

Figure 6A:
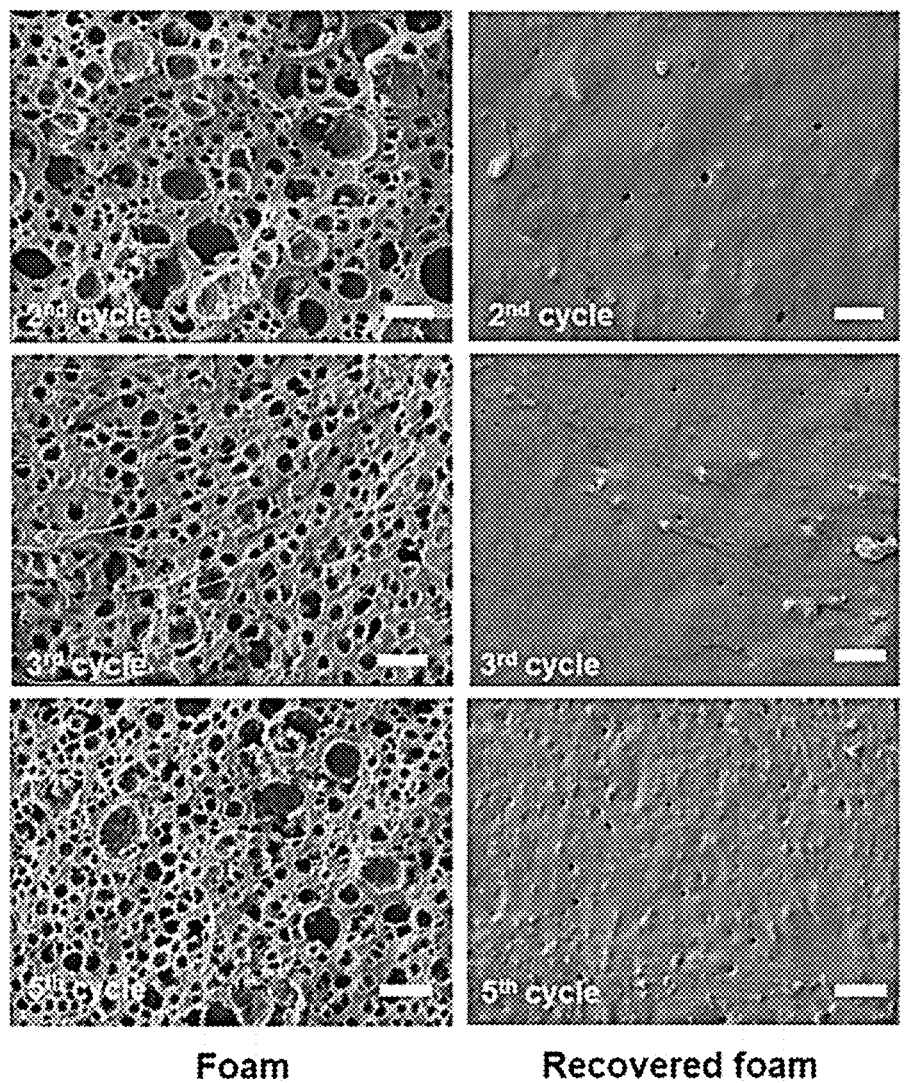
FIGS. 6A-6C.

The recovered foams have the ability to be re-foamed again in multiple cycles. It was found that a porous structure was reconstructed by saturating the recovered SEBS-50 foams again up to five cycles (FIG. 6A). An OTT behavior similar to that of original foam was observed since, during re-foaming, gas was able to diffuse back into the polymer matrix, which upon depressurization resulted in re-expanding the already collapsed pores (FIG. 6C).

Figure 6B:
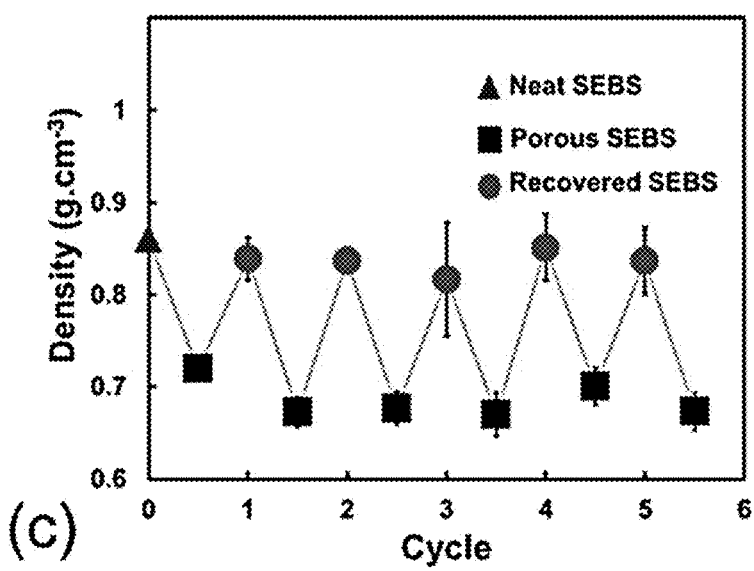
Figure 6C:
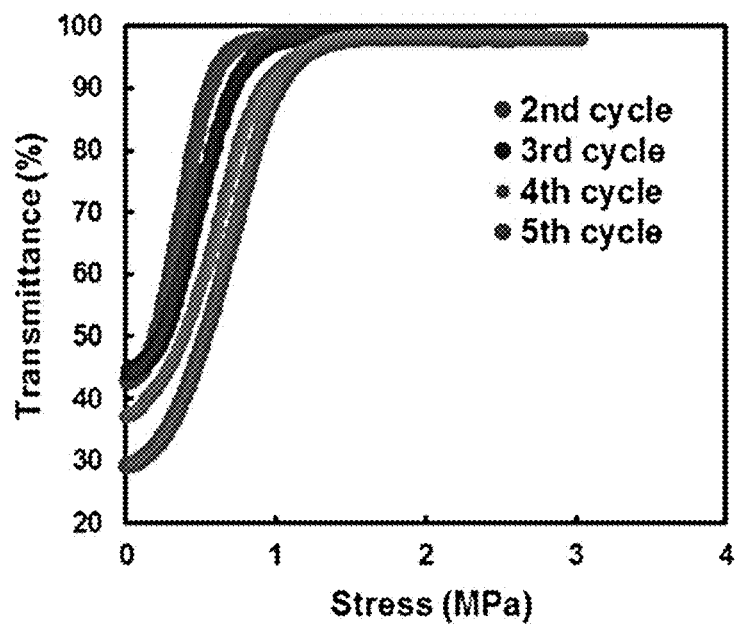

FIG. 6B illustrates density measurements for different cycles starting from a pristine film that was foamed and recovered while showing a consistent density variation before and after recovery at each cycle.

In-situ SIRP testing (FIG. 5C) revealed that re-foamed samples have the same OTT behavior as the first cycle, however, by increasing the number of cycles the initial opacity of the foams was slightly increased. This observation is associated with the introduction of some new nucleation sites to the already-existing ones (shrunk pores) resulting in more light refraction.

It is shown that the OTT is a bidirectional behavior up to several cycles—a recovered transparent film can be re-foamed through few stretching cycles of 100% at room temperature without use of a porogen (i.e. $CO_2$) at high pressures. The strain-driven foaming generates new pores in polymer, which renders it with a degree of opacity.

Figure 7A:
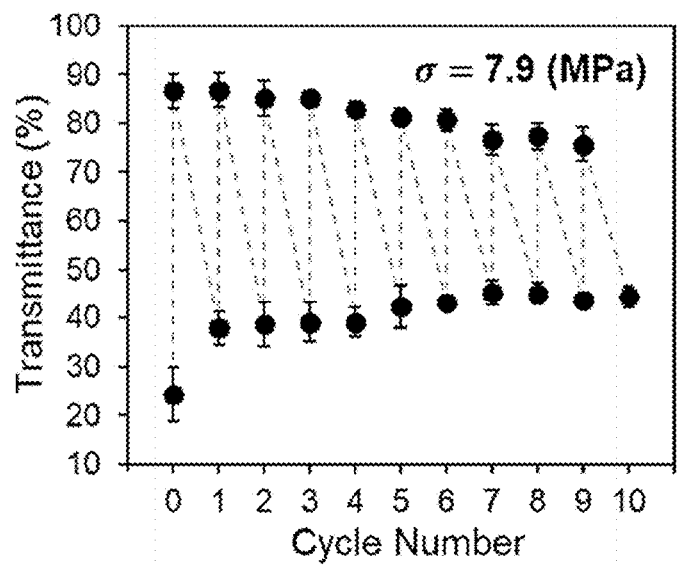
FIGS. 7A-7C.
Figure 7B:
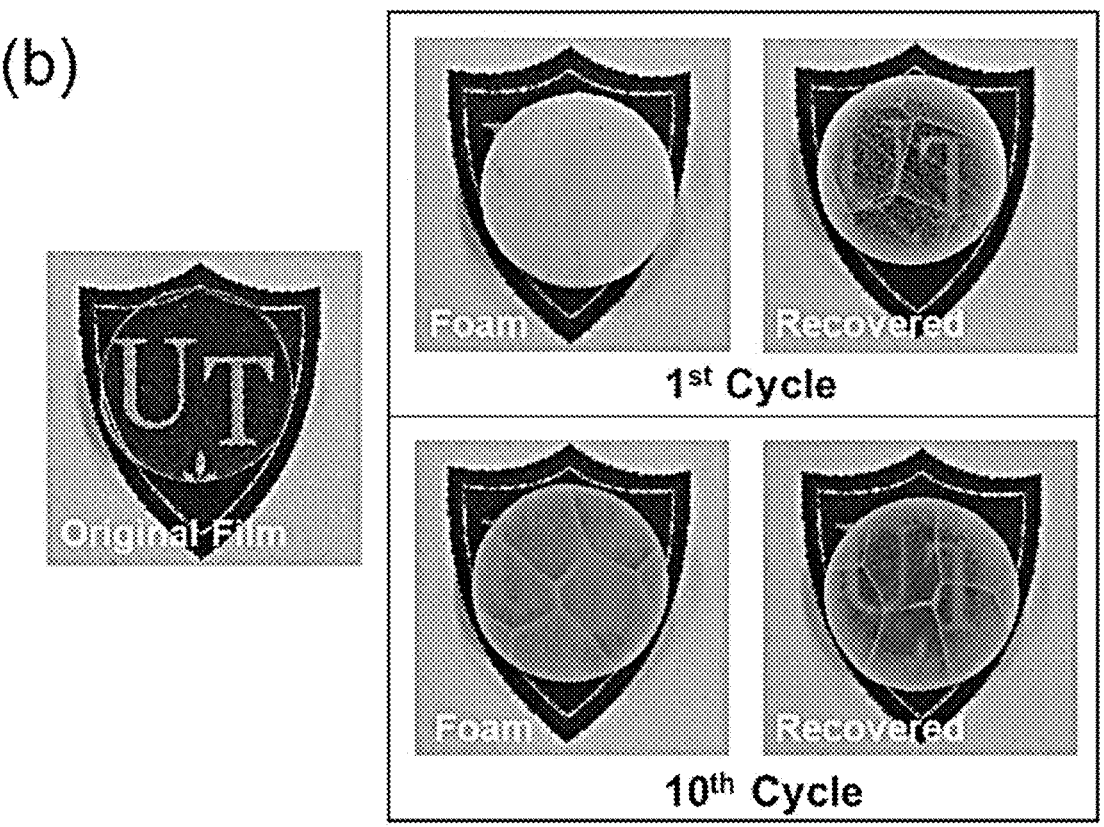
Figure 7C:
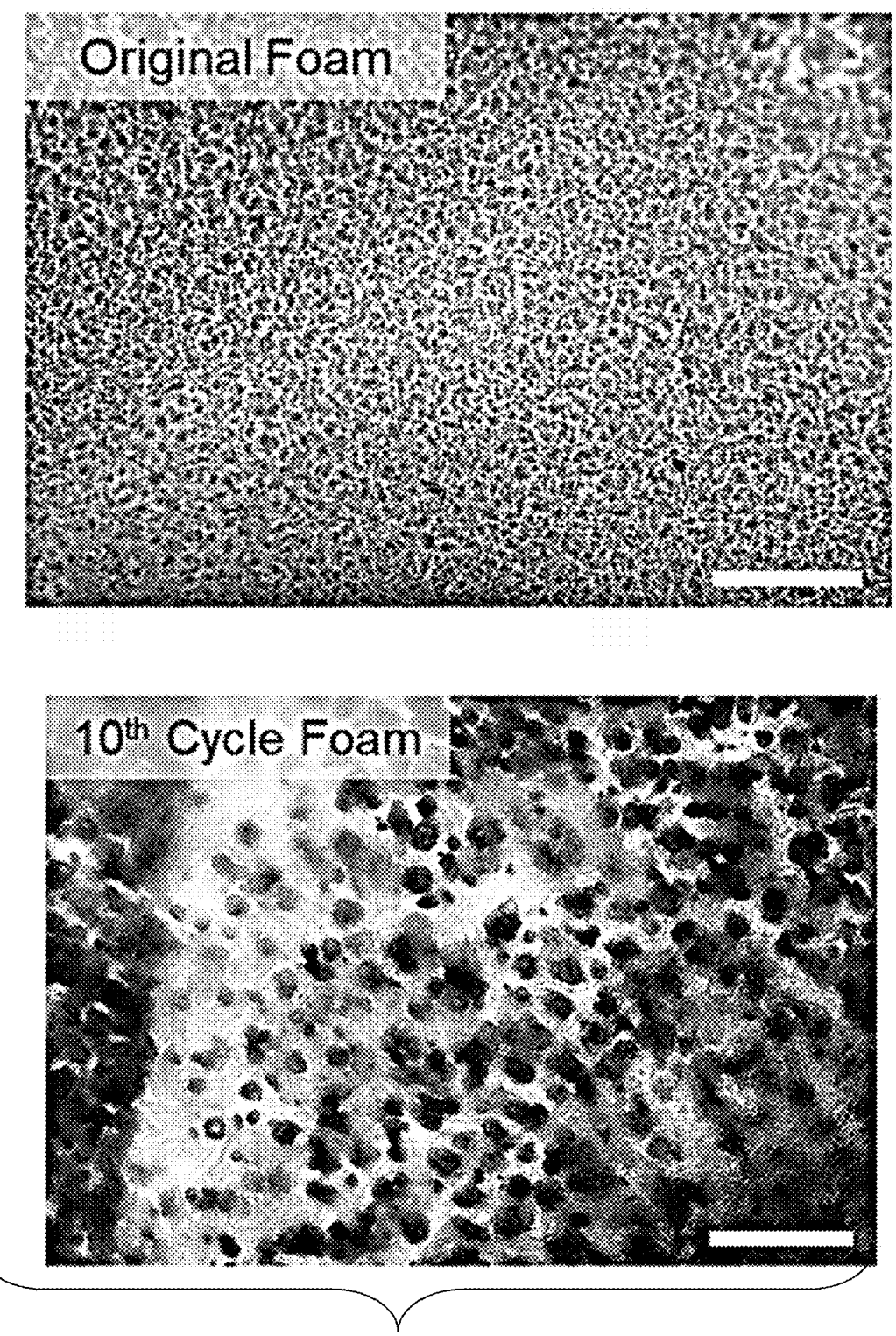

FIGS. 7A-B show the details on the two-way OTT behavior of thick SEBS-50 (initial film thickness of 1.3 mm; $\sigma=7.9$ (MPa)) foams evaluated for 10 cycles. It is believed that strain-driven pore generation originates from phase separation thermodynamics and polymer's entropic chain conformations. Beyond third cycle, the degree of opacity and transparency start to decrease and rise with a constant slope, respectively. However, the transparency contrast is still more than 30% that highlights reusability of films for stress sensing applications (FIG. 7B). Moreover, pictures of foams' morphologies confirm pore formation even after 10 cycles of strain-driven foaming and re-foaming cycles (FIG. 7C).

Figure 8A:
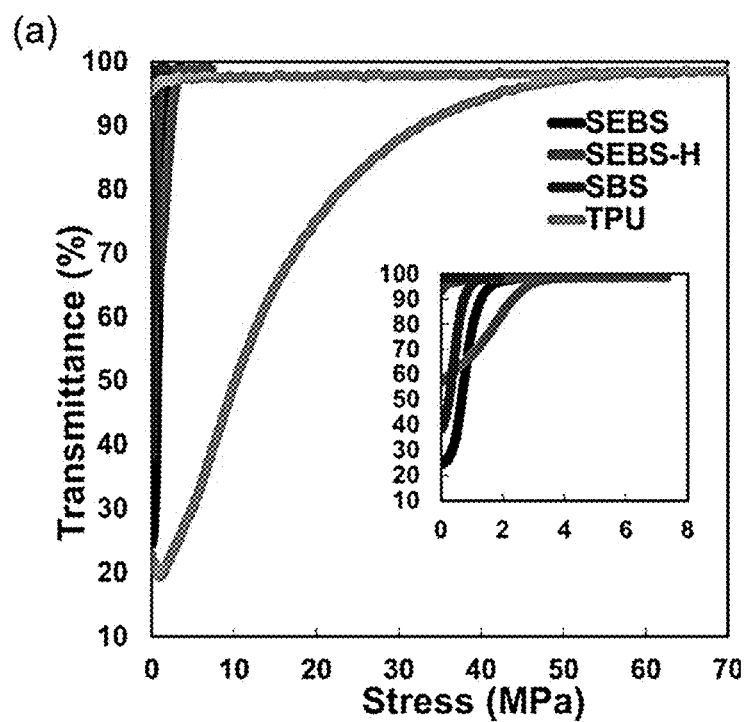
FIGS. 8A-8B: In-situ SIRP for different thermoplastic block copolymers showing a generic OTT of the foams. Stress-strain results for SIRP of different thermoplastic block copolymers. The insets resolved non-visible areas of the main plots.

In addition, we found that a similar SIRP with OTT behavior is reproducible for other block copolymer elastomers. FIG. 8A shows the in-situ SIRP results for different block copolymer elastomers. These porous films were processed with the same protocol as for SEBS except for TPU which was quenched at 70° C., since it did not foam at a lower temperature. As can be seen, SEBS-H with the same molecular weight but higher PS weight percent than SEBS requires almost 8 (MPa) stress for a permanent OTT. Moreover, the start transparency of this foam is almost twice as SEBS.

Figure 8B:
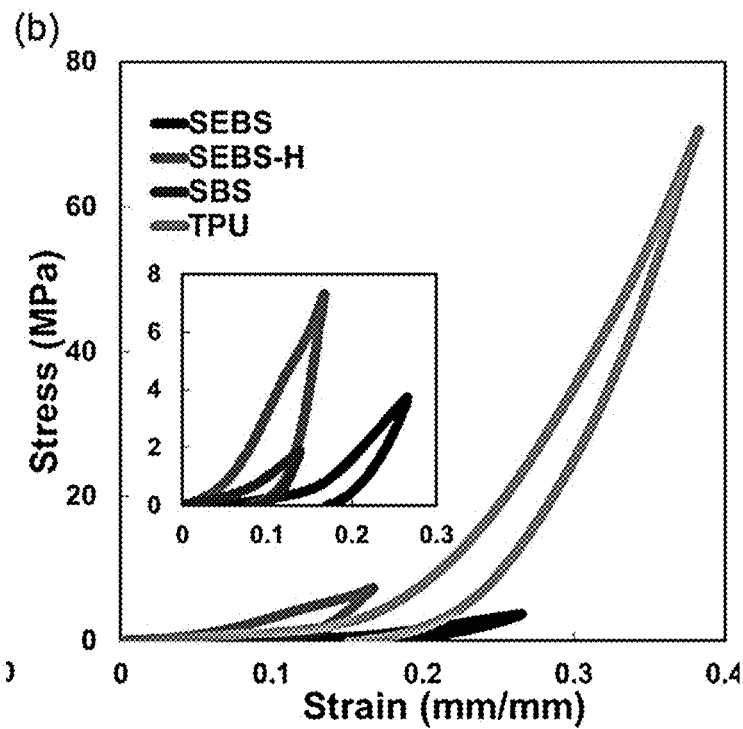

According to the SEM images, the SEBS-H has significantly higher average pore sizes yet less pore density with respect to SEBS foams. This difference is now believed to be related to higher PS content in the chains, which can increase the viscosity of the polymer in the heat quenching stage resulting in a reduction in number of nucleation sites with respect to SEBS. On the other hand, higher viscosity allows the expanding pores to grow more while protecting them from collapsing. Stress-strain plots for block copolymer foams revealed that the stress sensitivity of foams, which can be important for any pressure sensing application, can be altered through using different materials (FIG. 8B). Furthermore, these findings indicate that the OTT during SIRP is a general phenomenon observed in foamed cross-linked, networked or rubber-like materials.

Figure 18A:
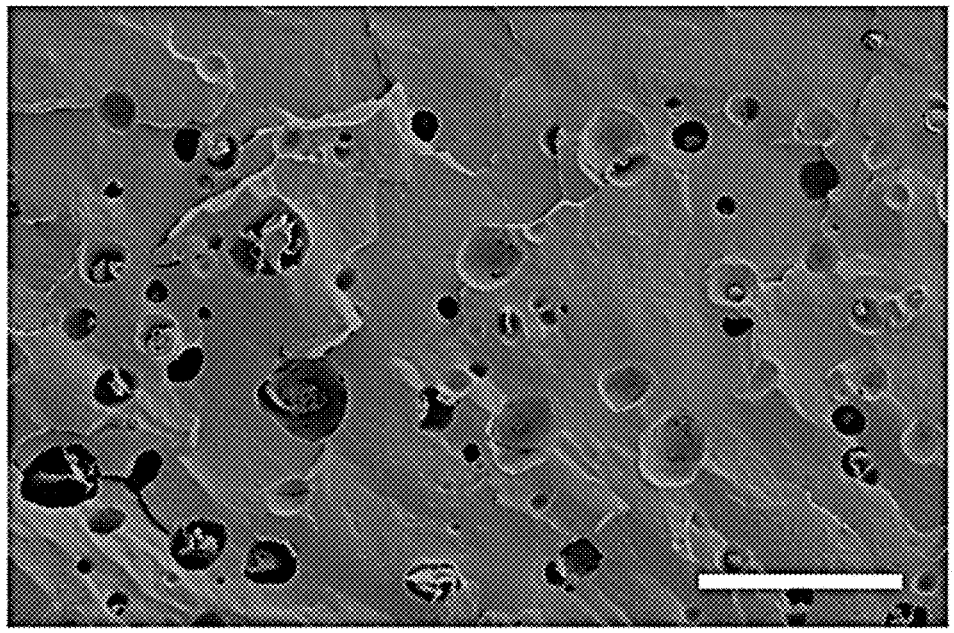
FIGS. 18A-18B: SEM images of SEBS-H foams before (FIG. 18A) and after recovery (FIG. 18A). Scale bars: 100 µm.
Figure 18B:
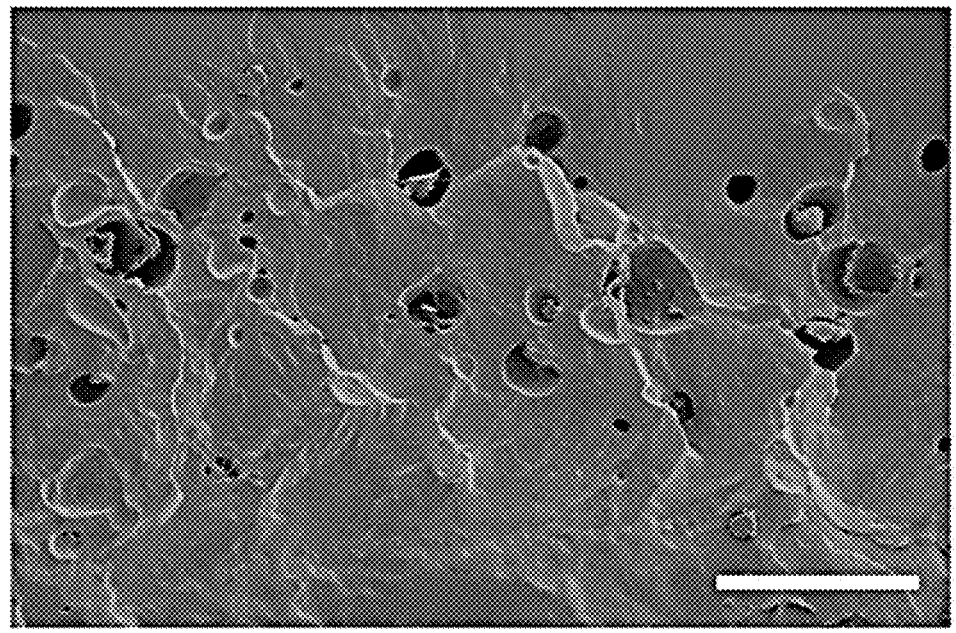

SEM images of SEBS-H foams before (FIG. 18A) and after recovery (FIG. 18A). Scale bars: 100 μm.

Figure 9A:
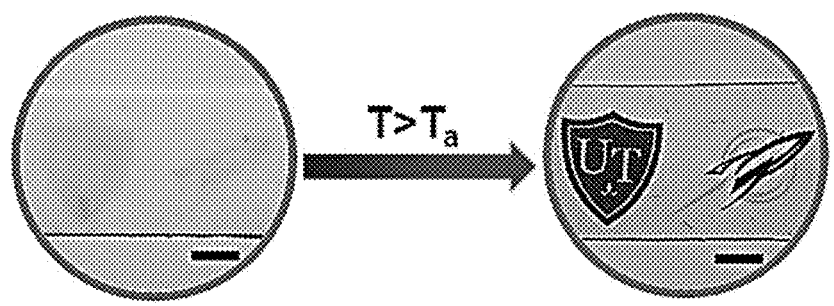
FIGS. 9A-9B.

It is shown that the OTT behavior can also transpire with a temperature stimulus (FIG. 9A). Particularly, a SEBS-30 foam undergoes a transparency variation from 45% to 95% in 3 min at 125° C.

Figure 9B:
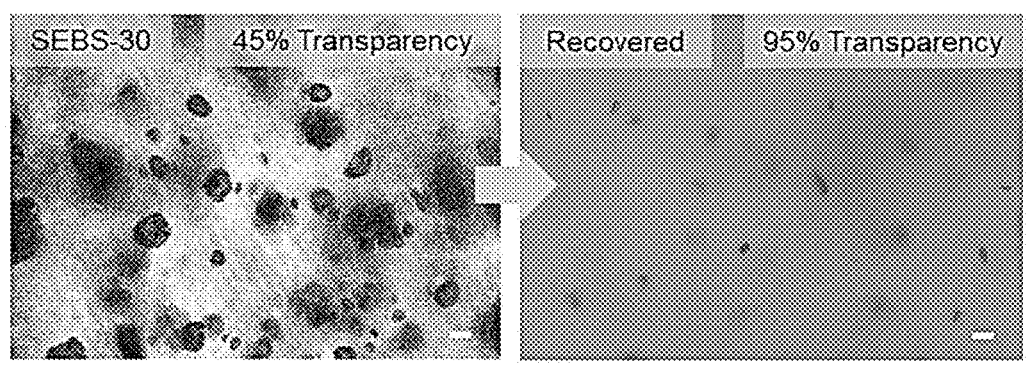

FIG. 9B shows the foams morphologies before and after temperature recovery, which results in significant pore reversion and thus optical clarity of the film.

Figure 10A:
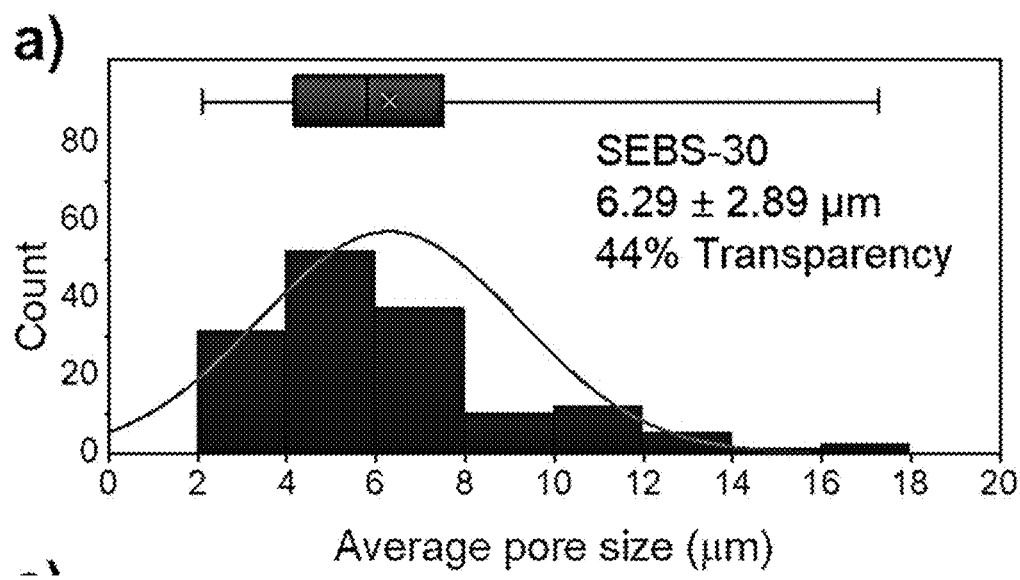
FIGS. 10A-10E.
Figure 10B:
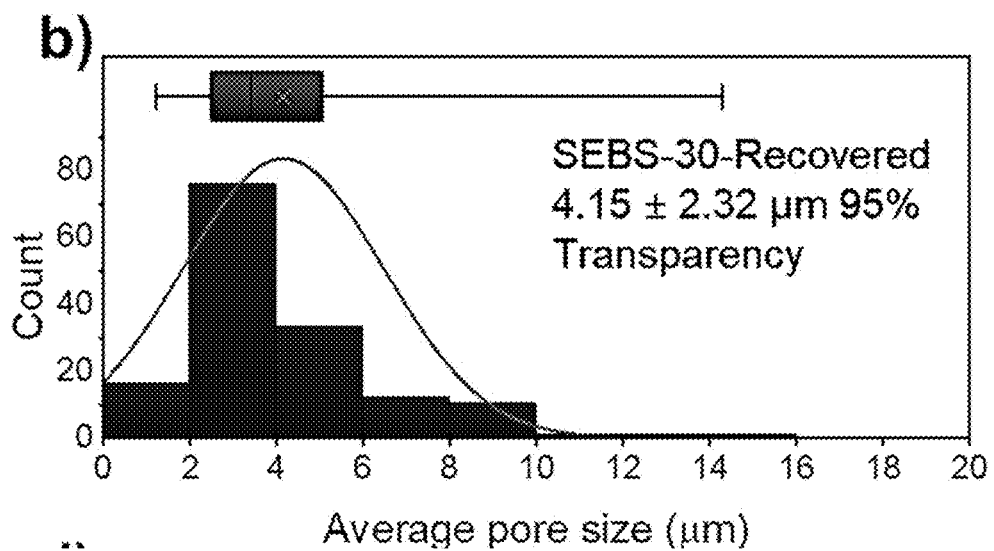
Figure 10C:
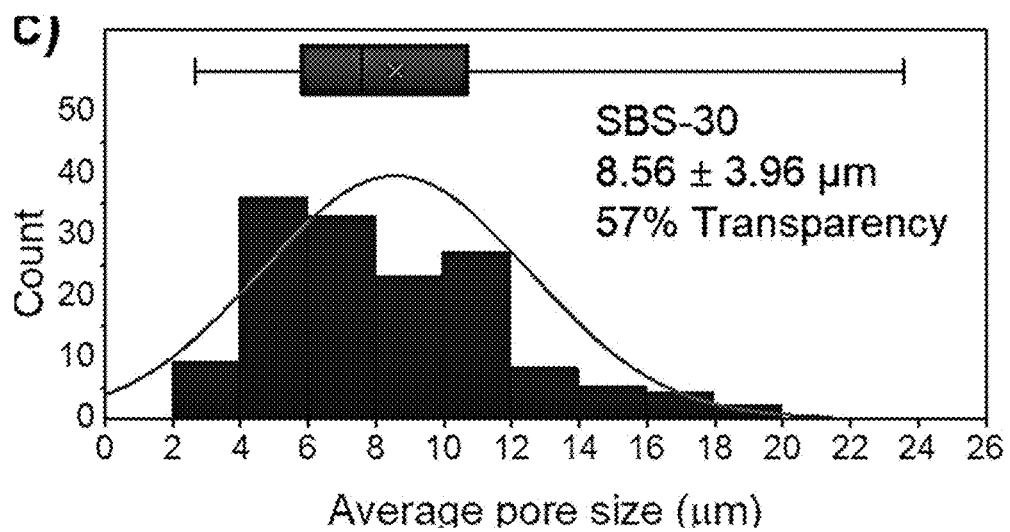
Figure 10D:
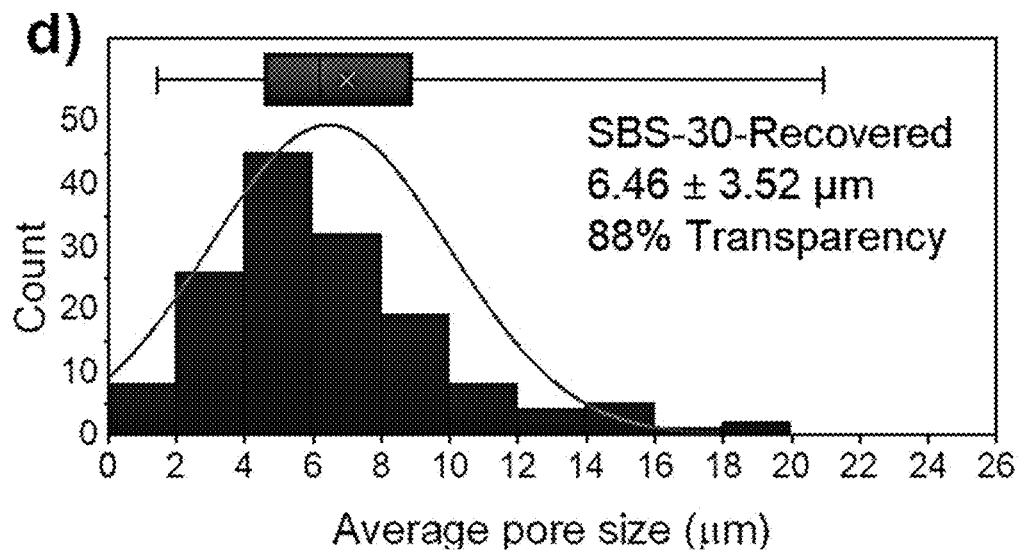
Figure 10E:
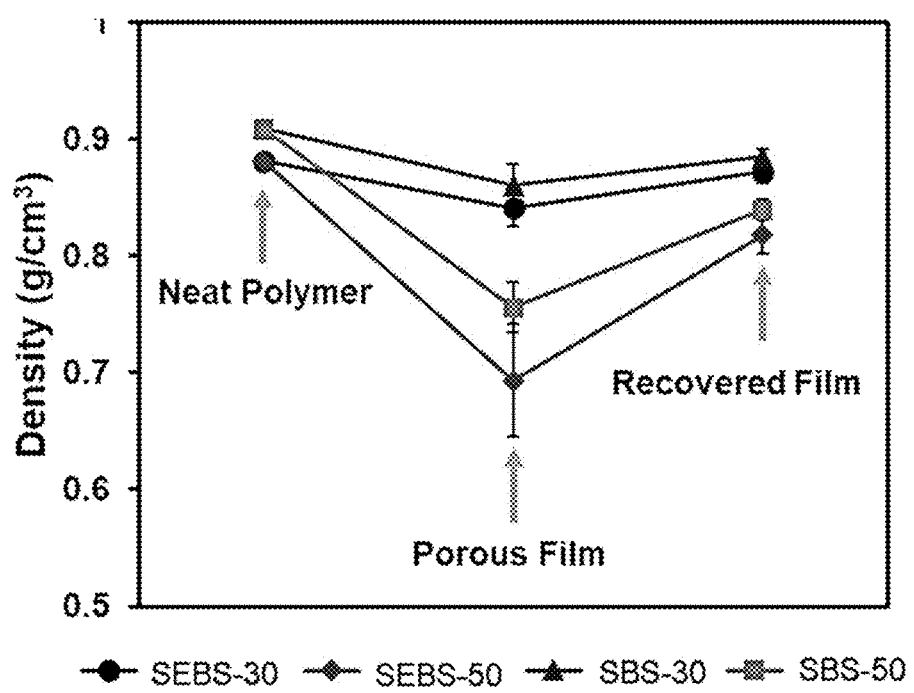

FIGS. 10A-D represent the histograms for SEBS-30 and SBS-30 (heated at 100° C. for 3 min) that confirm the pore shrinkage after temperature recovery by a normal distribution shift to lower average pore sizes. Similar to stress-driven pore reversion, the temperature-induced pathway is accompanied with a considerable volumetric shrinkage of the polymer structure (FIG. 10E).

It is now believed that the onus of temperature-driven OTT is on $T_g$ of polymer network's hard segments (i.e. polystyrene), which can be varied by its content when molecular weight remains constant. As a result, modulating the polystyrene content will directly tune OTT's onset. To this end, a SEBS variant (G1642, Kraton) was implemented, which has a similar molecular weight but a higher polystyrene content (21 wt. %). The high polystyrene content SEBS films were made with the same protocol as the previously described low polystyrene content SEBS-30 (G1645, Kraton; 11.3 wt. % of polystyrene). With an initial transparency of 49%, these films were activated for 3 min at 125° C., which increased their transparency to 77%. However, a 77% transparency is a low value compared to a 95% transparency for the low PS content sample. Therefore, a further 10° C. temperature increment to 135° C. resulted in an 88% transparency that confirms temperature recovery's dependence on the $T_g$ of hard-physically-crosslinked polystyrene segments.

Figure 11A:
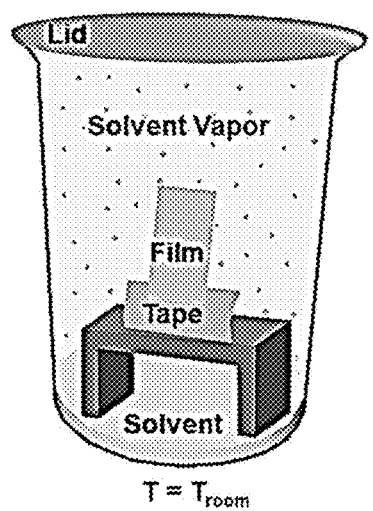

The films also experience an OTT behavior when they are exposed to a chemical vapor environment (e.g. tetrahydrofuran (THF)). The setup used for the vapor-responsive OTT is presented in FIG. 11A.

Figure 11B:
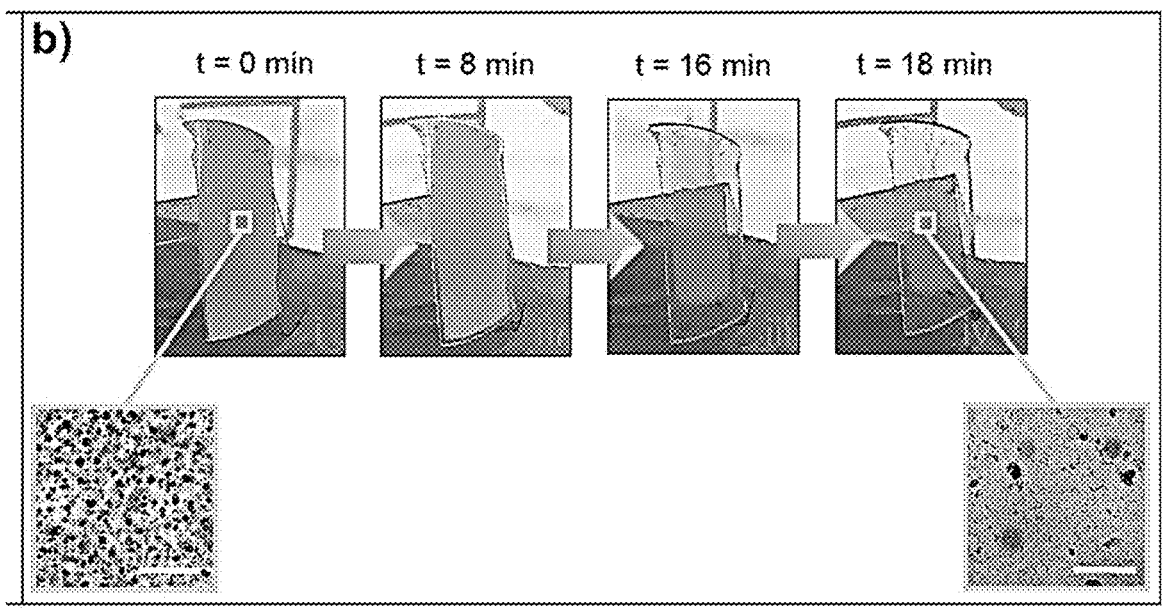
FIG. 11B: The experimental result for OTT of porous SEBS-S films in a THF vapor environment with the inset showing the corresponding morphologies using optical microscopy. Scale bars: 100 μm.

FIG. 11B shows that film's exposure to a THF's vapor environment for 18 min at room temperature triggers the pore reversion and in turn, the OTT behavior. The OTT phenomenon is first observed selectively at film's margins and then spreads to the rest of the sample as time progresses.

Conclusions

In these examples, pressure-, temperature-, and chemical-sensitive foams show an opaque to transparent transition (OTT) corresponding to a volumetric recovery have been fabricated. In the approach used, the local porous structure is reverted in response to an applied pressure, yet contrary to what is expected of soft, networked, hyperelastic materials, it does not recover when the pressure is removed. In contrast, after certain compressive stress, the porous structure recovers to its original shape by decreasing porosity level while simultaneously exhibiting an OTT behavior. Thermoplastic block copolymers, such as poly(styrene-ethylene/butylene-styrene) (SEBS), were implemented as the foamed material, while $CO_2$ solvent served as the blowing agent for the solid-state foaming process used in these examples. Entropic relaxation of polymer chains during SIRP results in significant (~17%) volumetric recovery, which renders the OTT behavior of the polymer. Moreover, the recovered foams have shown an ability to be re-foamed and recovered for several cycles while showing similar opto-mechanical properties at each cycle. Different block copolymers, such as SBS, SEBS-H, and TPU, exhibited the same OTT but with different sensitivity to compressive stress that illustrates this paradigm is general in these materials. Finally, the unique OTT behavior observed in these foams makes them a low-cost versatile pressure sensitive material that can be optically quantified.

Certain embodiments of the compositions and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. An article comprising a foam material comprising a polymer, wherein the article exhibits stress-induced reversible porosity characterized by an affine change in pore size after applying a stress; and
wherein the polymer comprises a block copolymer elastomer.

2. The article of claim 1, wherein the polymer comprises a physically or chemically cross-linked structure.

3. The article of claim 1, wherein the polymer comprises poly(styrene-ethylene/butylene-styrene) (SEBS).

4. The article of claim 1, wherein the polymer comprises poly(styrene-butadiene-styrene) (SBS).

5. The article of claim 1, wherein the polymer comprises thermoplastic polyurethane (TPU).

6. The article of claim 1, wherein the polymer is saturated with $CO_2$.

7. The article of claim 1, wherein the article is fabricated by casting a film of the polymer, placing the film in a high-pressure vessel with $CO_2$ for a first period of time, rapidly depressurizing the film, temperature quenching the film in water for a second period of time, and stabilizing the foam material in a water bath.

8. The article of claim 1, wherein the foam material has a thickness between 0.05 mm to 2 mm.

9. The article of claim 1, wherein the article is homogeneous.

10. The article of claim 1, wherein the article is transparent.

11. The article of claim 1, wherein the article is opaque.

12. The article of claim 1, wherein the article has pores having an average size of about 10 µm or less.

13. The article of claim 1, wherein the article has pores having an average size of about 5 µm or less.

14. The article of claim 1, wherein the article exhibits a non- recoverable porosity as a result of an applied load.

15. The article of claim 1, wherein the article is a homogenous, closed-cell porous structure.

16. The article of claim 1, wherein the article exhibits an ability to be re-foamed through ten stretch cycles without use of a pore forming solvent.

17. The article of claim 1, wherein thermal activation triggers a pore reversion in the article characterized by a volumetric recovery and an opaque-to-transparent transition (OTT) behavior.

18. The article of claim 1, wherein exposure to chemical vapors triggers a pore reversion in the article characterized by a volumetric recovery and an opaque-to-transparent transition (OTT) behavior.

19. The article of claim 1, wherein the article has an average pore size of 1.4±0.7 µm and a pore density of $1.7 \times 10^9$ pores/cm$^3$.

20. The article of claim 19, wherein the polymer comprises poly(styrene-ethylene/butylene-styrene) (SEBS).

21. The article of claim 1, wherein the article has an average pore size of 5.4±3.4 µm and a pore density of $0.7 \times 10^9$ pores/cm$^3$.

22. The article of claim 21, wherein the polymer comprises poly(styrene-ethylene/butylene-styrene) (SEBS).

23. The article of claim 1, wherein the article has an average pore size of 4.9±4.1 µm and a pore density of $11.5 \times 10^9$ pores/cm$^3$.

24. The article of claim 23, wherein the polymer comprises poly(styrene-ethylene/butylene-styrene) (SEBS).

25. The article of claim 1, wherein the article has an average pore size of 4.4±2.8 µm and a pore density of $2.1 \times 10^9$ pores/cm$^3$.

26. The article of claim 25, wherein the polymer comprises poly(styrene-ethylene/butylene-styrene) (SEBS).

27. The article of claim 1, wherein the polymer consists of poly(styrene-ethylene/butylene-styrene) (SEBS).

28. An article comprising a foam material comprising a polymer, wherein the article exhibits a stress-induced opaque-to-transparent transition characterized by an affine change in pore size after applying a stress; and
wherein the polymer comprises a block copolymer elastomer.

29. The article of claim 28, wherein the polymer consists of poly(styrene-ethylene/butylene-styrene) (SEBS).

* * * * *